US00RE50302E

(19) United States
(12) Reissued Patent
Jeong et al.

(10) Patent Number: US RE50,302 E
(45) Date of Reissued Patent: Feb. 18, 2025

(54) ICE-MAKING TRAY AND REFRIGERATOR COMPRISING SAME

(71) Applicant: SAMSUNG ELECTRONICS CO., LTD., Suwon-si (KR)

(72) Inventors: Jin Jeong, Yongin-si (KR); Bong su Son, Cheonan-si (KR); Do Yun Jang, Busan (KR); Jae Min Lee, Suwon-si (KR)

(73) Assignee: Samsung Electronics Co., Ltd., Suwon-si (KR)

(21) Appl. No.: 17/940,149

(22) Filed: Sep. 8, 2022

Related U.S. Patent Documents

Reissue of:
(64) Patent No.: 10,775,087
Issued: Sep. 15, 2020
Appl. No.: 16/058,104
Filed: Aug. 8, 2018

U.S. Applications:
(63) Continuation of application No. 15/029,703, filed as application No. PCT/KR2014/009684 on Oct. 15, 2014, now Pat. No. 10,072,885.

(30) Foreign Application Priority Data

Oct. 16, 2013 (KR) ..... 10-2013-0123551

(51) Int. Cl.
*F25C 1/24* (2018.01)
*F25C 1/18* (2006.01)
(Continued)

(52) U.S. Cl.
CPC ..... *F25C 1/24* (2013.01); *F25C 1/18* (2013.01); *F25C 1/243* (2013.01); *F25C 5/08* (2013.01);
(Continued)

(58) Field of Classification Search
CPC .... F25C 1/24; F25C 1/18; F25C 1/243; F25C 5/08; F25C 5/22; F25C 2400/06;
(Continued)

(56) References Cited

U.S. PATENT DOCUMENTS 2,069,567 A * 2/1937 White ..... F25C 1/24 219/218
2,478,312 A 8/1949 Peltier ..... F25C 1/24 62/526
(Continued)

FOREIGN PATENT DOCUMENTS

CN 2864516 1/2007
CN 102221276 10/2011
(Continued)

OTHER PUBLICATIONS

Korean Notice of Allowance dated Apr. 29, 2019 in Korean Patent Application No. 10-2013-0123551.
(Continued)

*Primary Examiner* — Patricia L Engle
(74) *Attorney, Agent, or Firm* — Nixon & Vanderhye P.C.

(57) ABSTRACT

An ice-making tray according to the concept of the present invention is capable of making ice at high speed and improving the transparency of ice by providing a second tray having ice cells for storing ice-making water to be coupled, in an overlapping manner, to the upper surface of a first tray which is in contact with a refrigerant pipe. The first tray may be formed of an aluminum material, the second tray may be formed of a plastic material, and the first tray formed of an aluminum material can efficiently function as a heat exchanger of an ice-making space due to having high thermal-conductivity. In the second tray, a fixing part for fixing the ice-making tray inside the ice-making space, a shaft accommodating part for accommodating the rotation shaft of an ejector, a temperature sensor accommodating part
(Continued)

for accommodating a temperature sensor, and an air insulating part for insulating the ice-making tray and an ice separating motor may be formed integrally.

15 Claims, 21 Drawing Sheets

(51) Int. Cl.
*F25C 1/243* (2018.01)
*F25C 5/08* (2006.01)
*F25C 5/20* (2018.01)
*F25D 11/02* (2006.01)
*F25D 21/14* (2006.01)

(52) U.S. Cl.
CPC ..... *F25C 5/22* (2018.01); *F25D 11/022* (2013.01); *F25D 21/14* (2013.01); *F25C 2400/06* (2013.01); *F25C 2400/14* (2013.01); *F25C 2700/12* (2013.01)

(58) Field of Classification Search
CPC ..... F25C 2400/14; F25C 2700/12; F25D 11/022; F25D 21/14
See application file for complete search history.

(56) References Cited

U.S. PATENT DOCUMENTS

| | | | | |
|---|---|---|---|---|
| 10,072,885 | B2 * | 9/2018 | Jeong | F25C 1/243 |
| 10,072,888 | B2 | 9/2018 | Jeong et al. | F25C 5/22 |
| 10,775,087 | B2 * | 9/2020 | Jeong | F25C 1/24 |
| 2004/0025527 | A1 | 2/2004 | Takahashi et al. | F25C 5/08 62/340 |
| 2006/0137382 | A1 | 6/2006 | Sasaki | F25C 1/04 62/340 |
| 2009/0026349 | A1 | 1/2009 | Shoukyuu et al. | F25C 1/22 249/111 |
| 2011/0000248 | A1 * | 1/2011 | Jeong | F25C 5/187 62/347 |
| 2012/0055188 | A1 | 3/2012 | Levie | F25C 1/24 249/70 |
| 2013/0061626 | A1 | 3/2013 | Son | F25C 5/22 62/344 |
| 2014/0182325 | A1 * | 7/2014 | Lee | F25C 1/04 62/340 |
| 2015/0316306 | A1 * | 11/2015 | Ji | F25C 1/04 62/340 |
| 2016/0245574 | A1 * | 8/2016 | Jeong | F25C 1/18 |
| 2017/0307270 | A1 * | 10/2017 | Kim | F25C 5/22 |
| 2023/0221052 | A1 * | 7/2023 | Lim | F25C 5/06 62/340 |

FOREIGN PATENT DOCUMENTS

| | | | | |
|---|---|---|---|---|
| CN | 202101483 | | 1/2012 | |
| CN | 202470566 | | 10/2012 | |
| JP | 4-28980 | | 1/1992 | |
| JP | 5-203302 | | 8/1993 | |
| JP | 2004-309046 | | 11/2004 | |
| JP | 2007-278662 | | 10/2007 | |
| JP | 2009-2607 | | 1/2009 | |
| JP | 2013-29284 | | 2/2013 | |
| KR | 20-1999-0027368 | | 7/1999 | |
| KR | 10-2011-0080103 | | 7/2011 | |
| KR | 10-2011-0080104 | | 7/2011 | |
| KR | 10-2012-0011162 | | 2/2012 | |
| KR | 10-2012-0124324 | | 11/2012 | |
| KR | 10-2013-0078530 | | 7/2013 | |
| KR | 10-2013-0078531 | | 7/2013 | |
| KR | 10-2013-0078532 | | 7/2013 | |
| WO | WO-2012150785 | A1 * | 11/2012 | F25B 49/00 |
| WO | WO-2015056977 | A1 * | 4/2015 | F25C 1/18 |

OTHER PUBLICATIONS

Korean Office Action dated Mar. 27, 2019 in Korean Patent Application No. 10-2013-0123551.
European Communication under Rule 71(3) dated Aug. 23, 2018 in European Patent Application No. 14854848.0.
Korean Office Action dated Sep. 7, 2018 in Korean Patent Application No. 10-2013-0123551.
European Office Action dated May 4, 2017 in European Patent Application No. 14854848.0.
International Search Report dated Feb. 13, 2015 in International Patent Application No. PCT/KR2014/009684.
Chinese Office Action dated Jul. 19, 2017 in Chinese Patent Application No. 201480056947.2.
Extended European Search Report dated Aug. 30, 2017 in European Patent Application No. 14854848.0.
Chinese Notice of Allowance dated Apr. 4, 2018 in Chinese Patent Application No. 201480056947.2.
U.S. Office Action dated Dec. 26, 2017 in U.S. Appl. No. 15/029,703.
U.S. Notice of Allowance dated May 9, 2018 in U.S. Appl. No. 15/029,703.
U.S. Appl. No. 15/029,703, filed Apr. 15, 2016, Jin Jeong, et al., Samsung Electronics Co., Ltd.

* cited by examiner

ICE-MAKING TRAY AND REFRIGERATOR COMPRISING SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation of U.S. patent application Ser. No. 15/029,703, filed Apr. 15, 2016, which is a U.S. national stage application of International Application No. PCT/KR2014/009684 filed Oct. 15, 2014, and claims the priority benefit of Korean Application No. 10-2013-0123551, filed Oct. 16, 2013, in the Korean Intellectual Property Office, the disclosures of which are incorporated herein by reference.

TECHNICAL FIELD

The present invention relates to a refrigerator having an ice-making tray which stores ice-making water, cools the ice-making water, and generates ice.

BACKGROUND ART

In general, a refrigerator is an appliance which includes storage compartments and cooling air supply units which supply cooling air to the storage compartments and thus maintains the freshness of stored food. The refrigerator may further include an ice-making chamber and an ice-making unit for generating ice.

An automatic ice-making unit includes an ice-making tray which stores ice-making water, an ejector which separates ice made by the ice-making tray, an ice-separating heater which heats the ice-making tray when the ice is separated from the ice-making tray, and an ice bucket which stores the ice separated from the ice-making tray.

Among ice-making methods for cooling ice-making water, a direct cooling method has a refrigerant pipe provided to extend into an ice-making chamber for cooling ice-making water and to be in contact with an ice-making tray. In such a direct cooling method, the ice-making tray receives cooling energy from the refrigerant pipe by thermal conduction. Accordingly, the direct cooling method has a merit in that a cooling speed of ice-making water is fast. However, when the cooling speed of ice-making water is excessively fast, ice which is not transparent and is turbid is generated.

DISCLOSURE

Technical Problem

The present invention is directed to providing an ice-making tray capable of generating ice of which transparency is improved by decreasing conductivity of cooling energy slightly, and a refrigerator having the same. Here, the ice-making tray is in contact with a refrigerant pipe, receives cooling energy from the refrigerant pipe by thermal conduction, and generates ice. At this time, the efficiency of a cooling function of an ice-making chamber by the ice-making tray, that is, the function in which the ice-making tray cools the ice-making chamber while exchanging heat with air in the ice-making chamber, does not decrease.

In addition, the present invention is also directed to providing an integrated ice-making tray in which the ice-making tray and related parts of the ice-making tray are integrated.

Technical Solution

One aspect of the present invention provides a refrigerator including: a main body; an ice-making chamber formed in the main body; a refrigerant pipe which is provided in the ice-making chamber and in which a refrigerant flows; and an ice-making tray which stores ice-making water and generates ice, wherein the ice-making tray includes: a first tray in contact with the refrigerant pipe to receive cooling energy from the refrigerant pipe; and a second tray having at least one ice-making cell which stores the ice-making water, coupled to overlap a top surface of the first tray to receive the cooling energy from the first tray, and formed of a material having a lower thermal conductivity than the first tray.

Here, the first tray may be formed of an aluminum material, and the second tray may be formed of a plastic material.

The cooling energy in the refrigerant pipe may sequentially pass through the first tray and the second tray, and may be transmitted to the ice-making water stored in the at least one ice-making cell.

At least one heat-transfer-area-reducing hole may be formed in the first tray to decrease a heat transfer area between the first tray and the refrigerant pipe such that a cooling speed of the ice-making water is delayed.

At least one auxiliary hole may be formed in the first tray to decrease a heat transfer area between the first tray and the second tray such that a cooling speed of the ice-making water is delayed.

At least one ice-making cell accommodating part which is provided to correspond to the at least one ice-making cell and accommodates the at least one ice-making cell may be formed in the first tray.

At least one heat exchanging rib may protrude at the first tray to expand an area through which heat transfers from the first tray to air in the ice-making chamber, and to facilitate cooling of the air in the ice-making chamber.

A refrigerant pipe accommodating part which accommodates the refrigerant pipe may be formed in the first tray.

An ice-separating heater accommodating part which accommodates an ice-separating heater configured to emit heat to separate the ice may be formed in the first tray.

Each of the first tray and the second tray may be integrally formed.

Another aspect of the present invention provides a refrigerator including: a main body; an ice-making chamber formed in the main body; a refrigerant pipe in which a refrigerant flows; an ice-making chamber fan configured to forcibly flow air in the ice-making chamber; and an ice-making tray which stores ice-making water and generates ice, wherein the ice-making tray includes: a first tray having a refrigerant pipe accommodating part which accommodates the refrigerant pipe; and a second tray having at least one ice-making cell which stores the ice-making water, and coupled to overlap a top surface of the first tray, and at least one heat-transfer-area-reducing hole is formed in the refrigerant pipe accommodating part of the first tray to decrease a heat transfer area between the first tray and the refrigerant pipe such that a cooling speed of the first tray is delayed.

Here, the second tray may be formed of a material having a lower thermal conductivity than the first tray.

Cooling energy in the refrigerant pipe may sequentially pass through the first tray and the second tray, and may be transmitted to the ice-making water stored in the at least one ice-making cell.

At least one ice-making cell accommodating part which is provided to correspond to the at least one ice-making cell and accommodates the at least one ice-making cell may be formed in the first tray.

At least one heat exchanging rib may protrude at the first tray to expand an area through which heat transfers from the first tray to air in the ice-making chamber, and to facilitate cooling of the air in the ice-making chamber.

Still another aspect of the present invention provides an ice-making tray which is in contact with a refrigerant pipe of a refrigerator, receives cooling energy, and generates ice, including: a first tray in which a refrigerant pipe accommodating part which accommodates the refrigerant pipe is formed at a lower portion thereof; and a second tray having at least one ice-making cell which stores ice-making water, coupled to overlap a top surface of the first tray, and formed of a material having a lower thermal conductivity than the first tray.

Here, at least one heat-transfer-area-reducing hole may be formed in the refrigerant pipe accommodating part of the first tray to decrease a heat transfer area between the first tray and the refrigerant pipe such that a cooling speed of ice-making water is delayed.

The second tray includes a fixing part which fixes the ice-making tray in the ice-making chamber.

The fixing part may include a groove part coupled to a hook part provided at a ceiling of an inner box of the ice-making chamber.

The fixing part may include a mounting part which is put on and supported by a supporting part provided in the ice-making chamber.

The fixing part may be formed at an upper outside of the ice-making cell of the second tray.

An upper side of the ice-making cell of the second tray may be open.

The second tray may include a water supply hole through which water is supplied to the ice-making chamber.

The first tray and the second tray may respectively include a first coupling part and a second coupling part which are respectively coupled to each other.

The first coupling part and the second coupling part may be respectively provided at sides of the first tray and the second tray, and may be elastically coupled to each other.

The refrigerator may further include: an ejector which rotates to separate ice in the ice-making cell; and an ice separating motor which supplies a rotational force to the ejector, wherein the second tray may include an air insulating part which insulates the ice-making tray from the ice separating motor.

The air insulating part may include an air accommodating part in which air is accommodated, and an air wall part protruding from the second tray such that the air accommodating part is formed.

The refrigerator may further include an ejector which rotates to separate ice in the ice-making cell, and has a rotating shaft and an ejector body protruding from the rotating shaft, wherein the second tray may include a plurality of rotating shaft supporting parts which rotatably support the rotating shaft.

The second tray may include a temperature sensor accommodating part in which a temperature sensor configured to measure a temperature of the ice-making cell is accommodated.

The second tray may include a separation preventing wall which extends upward from one end in a widthwise direction of the second tray to guide a movement of ice when the ice is separated from the ice-making cell, and a slit which blocks thermal conduction may be formed in the separation preventing wall.

The first tray may include at least one drain hole which drains defrosted water generated between contact parts of the first tray and the second tray.

The refrigerator may further include a drain duct provided under the ice-making tray to collect defrosted water of the ice-making tray, and to form a circulation flow path of cooling air, wherein the drain duct may include: a drain plate which collects defrosted water; a frost preventing cover which surrounds a lower portion of the drain plate to prevent frost from occurring in the drain plate; and an air insulating layer formed between the drain plate and the frost preventing cover.

Yet another aspect of the present invention provides a refrigerator including: a main body; an ice-making chamber formed in the main body; an ice-making tray which stores ice-making water, cools the ice-making water, and generates ice; an ejector rotatably provided to separate ice generated at the ice-making tray from the ice-making tray; and an ice separating motor which supplies a rotational force to the ejector, wherein the ice-making tray includes: an upper tray having an ice-making cell which stores ice-making water, and a rotating shaft accommodating part which rotatably accommodates a rotating shaft of the ejector; and a lower tray which is provided to overlap the upper tray at a lower side of the upper tray, and transmits cooling energy to the upper tray.

The lower tray may be provided to be in contact with a refrigerant pipe.

The upper tray may be formed of a material having a lower thermal conductivity than the lower tray.

The upper tray may be formed of a plastic material, and the lower tray may be formed of an aluminum material.

The upper tray may include a temperature sensor accommodating part in which a temperature sensor configured to measure a temperature of the ice-making cell is accommodated.

The upper tray may include an air insulating part which insulates the ice-making tray from the ice separating motor.

The upper tray may include a fixing part which fixes the ice-making tray in the ice-making chamber.

Advantageous Effects

According to the embodiments of the present invention, a direct cooling ice-making tray according to the present inventive concept can generate ice having improved transparency by decreasing a cooling speed of ice-making water slightly compared to a conventional direct cooling ice-making tray formed of only an aluminum material. In addition, the direct cooling ice-making tray according to the present inventive concept can still have a cooling speed faster than that of an indirect cooling method.

An ice-making tray according to the present inventive concept can be easily assembled using a method in which each of an aluminum tray and a plastic tray is integrally formed, and the plastic tray is simply disposed to overlap a top surface of the aluminum tray.

Since an aluminum tray having excellent thermal conductivity is disposed at a lower portion of a direct cooling ice-making tray according to the present inventive concept, and a heat exchanging rib which expands an area which transfers heat to air in an ice-making chamber is formed at the aluminum tray, the performance for cooling an inner portion of the ice-making chamber can be maintained the same as that of a conventional ice-making tray.

According to the present inventive concept, since related parts of an ice-making tray are integrally unified to the ice-making tray, and the number of the parts is decreased, assembly performance and productivity can be improved.

MODES OF THE INVENTION

Hereinafter, exemplary embodiments of the present invention will be described in detail.

Figure 1:
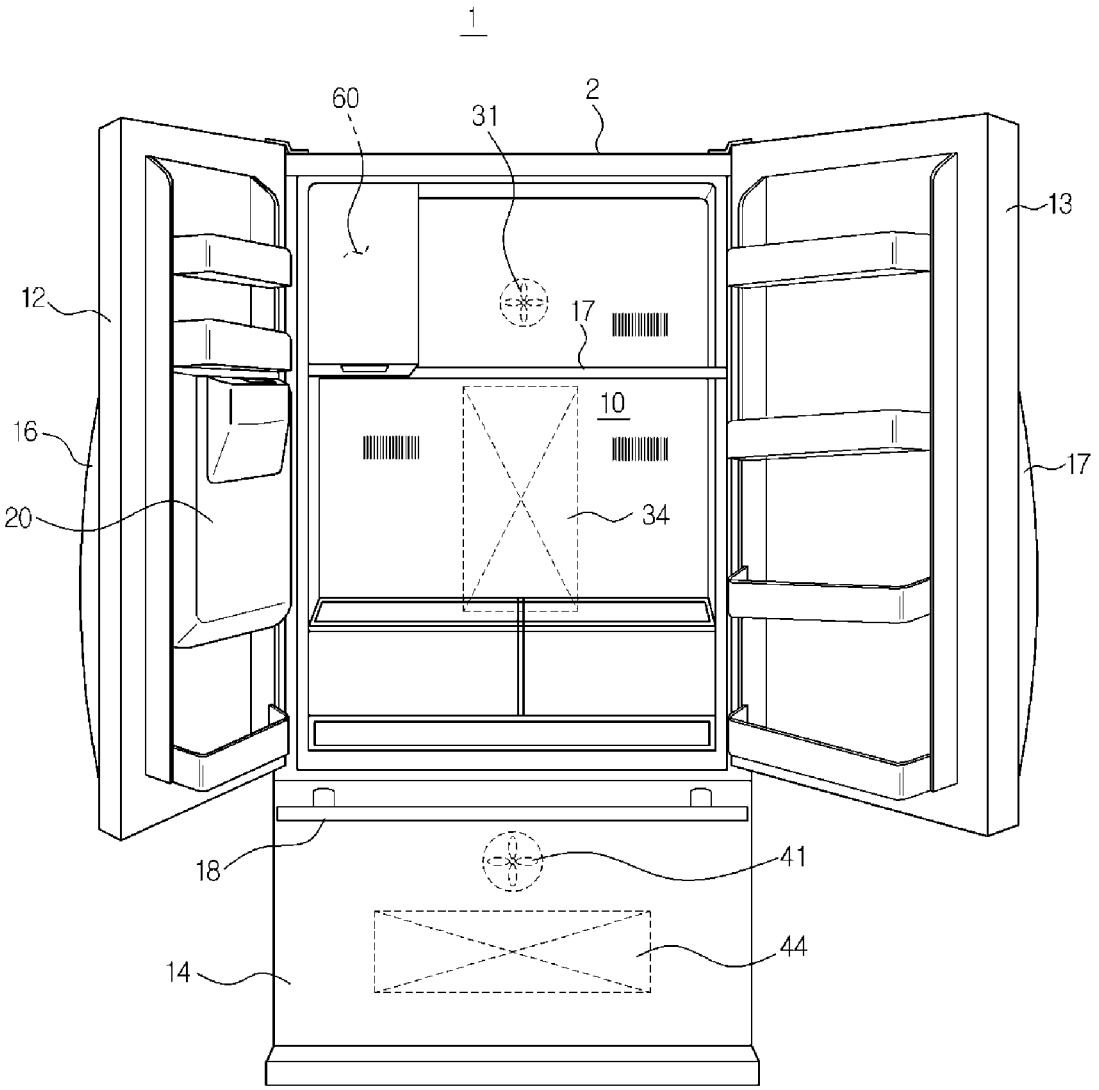
FIG. 1 is a view illustrating an exterior of a refrigerator according to an embodiment of the present invention.
Figure 2:
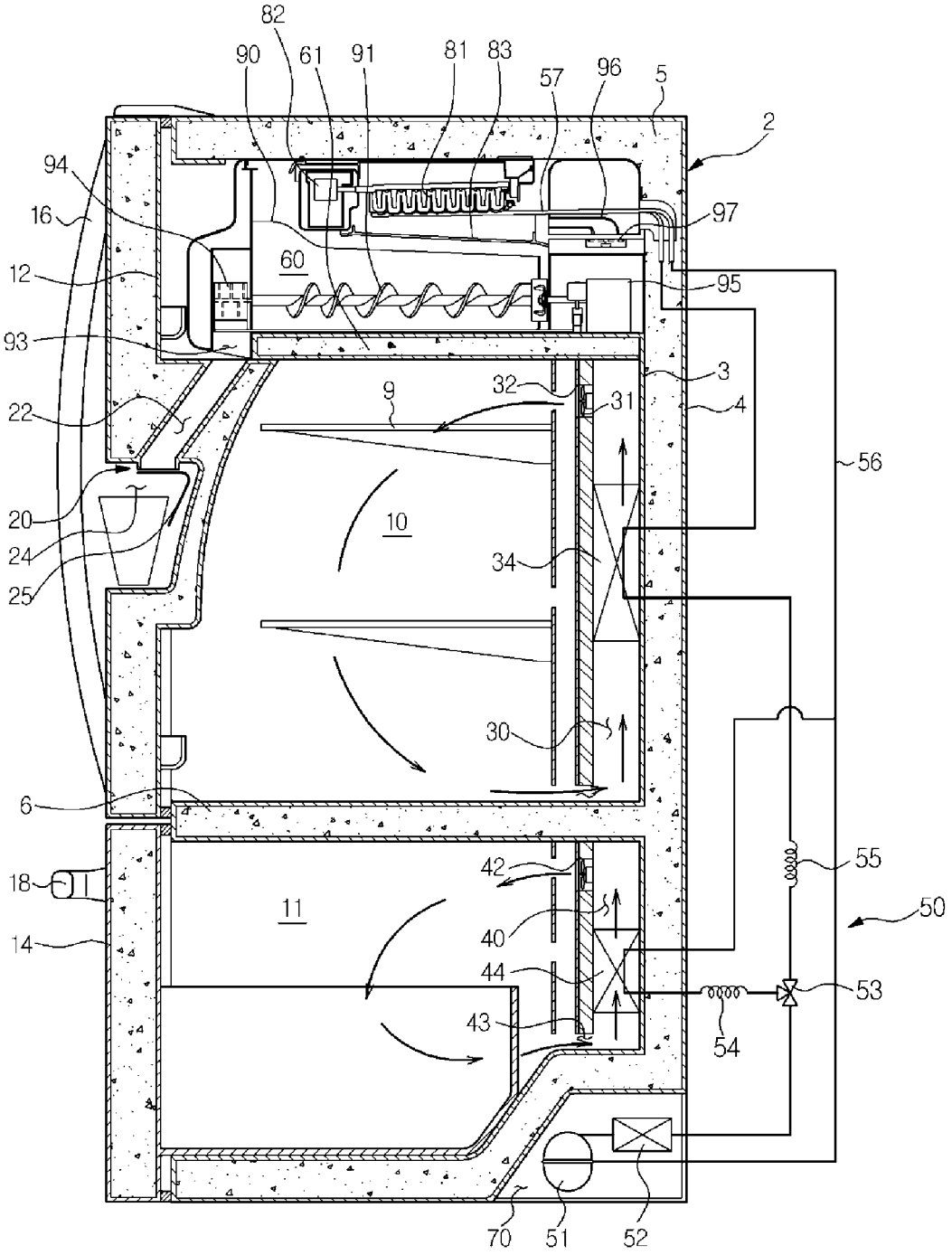
FIG. 2 is a schematic cross-sectional view illustrating an internal structure of the refrigerator of FIG. 1.
Figure 3:
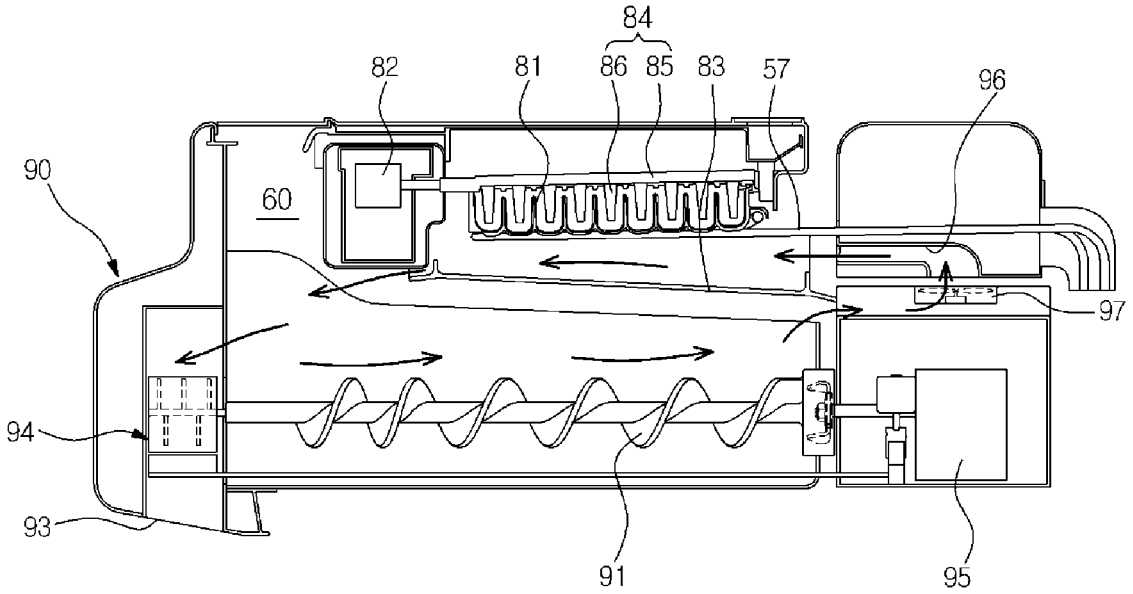
FIG. 3 is a schematic enlarged cross-sectional view illustrating a structure of an ice-making chamber of the refrigerator of FIG. 1.

FIG. 1 is a view illustrating an exterior of a refrigerator according to an embodiment of the present invention, FIG. 2 is a schematic cross-sectional view illustrating an internal structure of the refrigerator of FIG. 1, and FIG. 3 is a schematic enlarged cross-sectional view illustrating a structure of an ice-making chamber of the refrigerator of FIG. 1.

Referring to FIGS. 1 to 3, a refrigerator 1 according to an embodiment of the present invention may include a main body 2, storage compartments 10 and 11 capable of keeping food refrigerated or frozen, an ice-making chamber 60 formed to be partitioned off from the storage compartments 10 and 11 by an ice-making chamber wall 61, and a cooling unit 50 for supplying cold air to the storage compartments 10 and 11 and the ice-making chamber 60.

The main body 2 may include an inner box 3 forming the storage compartments 10 and 11, an outer box 4 coupled to an outside of the inner box 3 and forming the exterior, and an insulating material 5 foamed between the inner box 3 and the outer box 4.

The storage compartments 10 and 11 may be formed such that a front surface thereof is open, and may be partitioned into a refrigerator compartment 10 at an upper side thereof and a freezer compartment 11 at a lower side thereof by a horizontal partition 6. The horizontal partition 6 may include an insulation material for blocking heat exchange between the refrigerator compartment 10 and the freezer compartment 11.

Shelves 9 on which food is put and which vertically divide a storage space of the refrigerator compartment 10 may be disposed in the refrigerator compartment 10. The open front surface of the refrigerator compartment 10 may be hinge-coupled to the main body 2, and be opened and closed by a pair of doors 12 and 13 which are rotatable. Handles 16 and 17 configured to open and close the doors 12 and 13 may be respectively provided at the doors 12 and 13.

A dispenser 20 capable of dispensing ice from the ice-making chamber 60 to an outside thereof without opening a door 12 may be provided at the door 12. The dispenser 20 may include an dispensing space 25 through which ice is dispensed, a lever 25 by which ice is determined whether to be dispensed or not, and a chute 22 which guides the ice discharged through an ice discharge hole 93 to the dispensing space 25.

An open front surface of the freezer compartment 11 may be opened and closed by a sliding door 14 capable of sliding in the freezer compartment 11. A storage box 19 capable of accommodating food may be provided at a rear surface of the sliding door 14. A handle 18 configured to open and close the sliding door 14 may be provided at the sliding door 14.

The cooling unit 50 may include a compressor 51 which compresses a refrigerant using high pressure, a condenser 52 which condenses the compressed refrigerant, expansion units 54 and 55 which expand the refrigerant to low pressure, evaporators 34 and 44 which evaporate the refrigerant and generate cold air, and a refrigerant pipe 56 which guides the refrigerant.

The compressor 51 and the condenser 52 may be disposed in a machine compartment 70 provided at a rear lower portion of the main body 2. In addition, the evaporators 34 and 44 may be respectively disposed at a refrigerator compartment cold air supply duct 30 which is provided at the refrigerator compartment 10, and a freezer compartment cold air supply duct 40 which is provided at the freezer compartment 11.

The refrigerator compartment cold air supply duct 30 may include an inlet 33, a cold air discharge hole 32, and a blower fan 31, and may circulate cold air in the refrigerator compartment 10. In addition, the freezer compartment cold air supply duct 40 may include an inlet 43, a cold air discharge hole 42, and a blower fan 41, and may circulate cold air in the freezer compartment 11.

The refrigerant pipe 56 may be divided at one dividing position such that a refrigerant flows to the freezer compartment 11 or the refrigerant flows to the refrigerator compartment 10 and the ice-making chamber 60, and a switching valve 53 which switches a flow path of the refrigerant may be installed at the dividing position.

A part 57 of the refrigerant pipe 56 may be disposed in the ice-making chamber 60 to cool the ice-making chamber 60. The refrigerant pipe 57 disposed in the ice-making chamber 60 may be in contact with an ice-making tray 81, and may directly supply cooling energy to the ice-making tray 81 by thermal conduction.

Hereinafter, the part 57 of the refrigerant pipe disposed in the ice-making chamber 60 to be in contact with the ice-making tray 81 is referred to as an ice-making chamber refrigerant pipe 57. A refrigerant in a liquid state may pass through the expansion unit 55 to become a low temperature and low pressure state, flow in the ice-making chamber refrigerant pipe 57 to absorb heat in the ice-making tray 81 and the ice-making chamber 60, and evaporate in a gas state. Accordingly, the ice-making chamber refrigerant pipe 57 and the ice-making tray 81 may serve as an evaporator in the ice-making chamber 60.

An ice maker includes the ice-making tray 81 which stores ice-making water, an ejector 84 which separates ice from the ice-making tray 81, an ice separating motor 82 which rotates the ejector 84, an ice-separating heater 87 which heats the ice-making tray 81 to separate ice easily when the ice is separated from the ice-making tray 81, an ice bucket 90 which stores ice generated by the ice-making tray 81, a drain duct 83 which collects defrosted water of the ice-making tray 81 and simultaneously guides an air flow in the ice-making chamber 60, and an ice-making chamber fan 97 which circulates air in the ice-making chamber 60.

The ice bucket 90 is disposed under the ice-making tray 81 to collect ice which falls from the ice-making tray 81. The ice bucket 90 is provided with an auger 91 which transfers stored ice to the ice discharge hole 93, an auger motor 95 which drives the auger 91, and a grinding unit 94 capable of grinding ice.

The auger motor 95 may be disposed at a rear of the ice-making chamber 60, and the ice-making chamber fan 97 may be disposed above the auger motor 95. A guiding path 96 which guides air discharged from the ice-making chamber fan 97 toward a front side of the ice-making chamber 60 may be provided above the ice-making chamber fan 97.

Air which forcibly flows by the ice-making chamber fan 97 may circulate in the ice-making chamber 60 in an arrow direction denoted in FIG. 3. That is, the air discharged upward from the ice-making chamber fan 97 may flow through the guiding path 96 and may flow between the ice-making tray 81 and the drain duct 83. At this time, the air may exchange heat with the ice-making tray 81 and the ice-making chamber refrigerant pipe 57, and the cooled air may flow to a side of the ice discharge hole 93 of the ice bucket 90 and may be suctioned by the ice-making chamber fan 97.

A lower portion of the ice-making tray 81 according to an embodiment of the present invention may include a first tray 100 (see FIG. 4) formed of an aluminum material, which will be described below. Since a heat exchanging rib 180 (see FIG. 6), which expands an area which transfers heat to air in the ice-making chamber 60, is provided at the first tray 100, the efficiency of exchanging heat of internal air between the ice-making tray 81 and the ice-making chamber 60 is increased, and accordingly, an inner portion of the ice-making chamber 60 may be efficiently maintained to be cooled and chilled.

Figure 4:
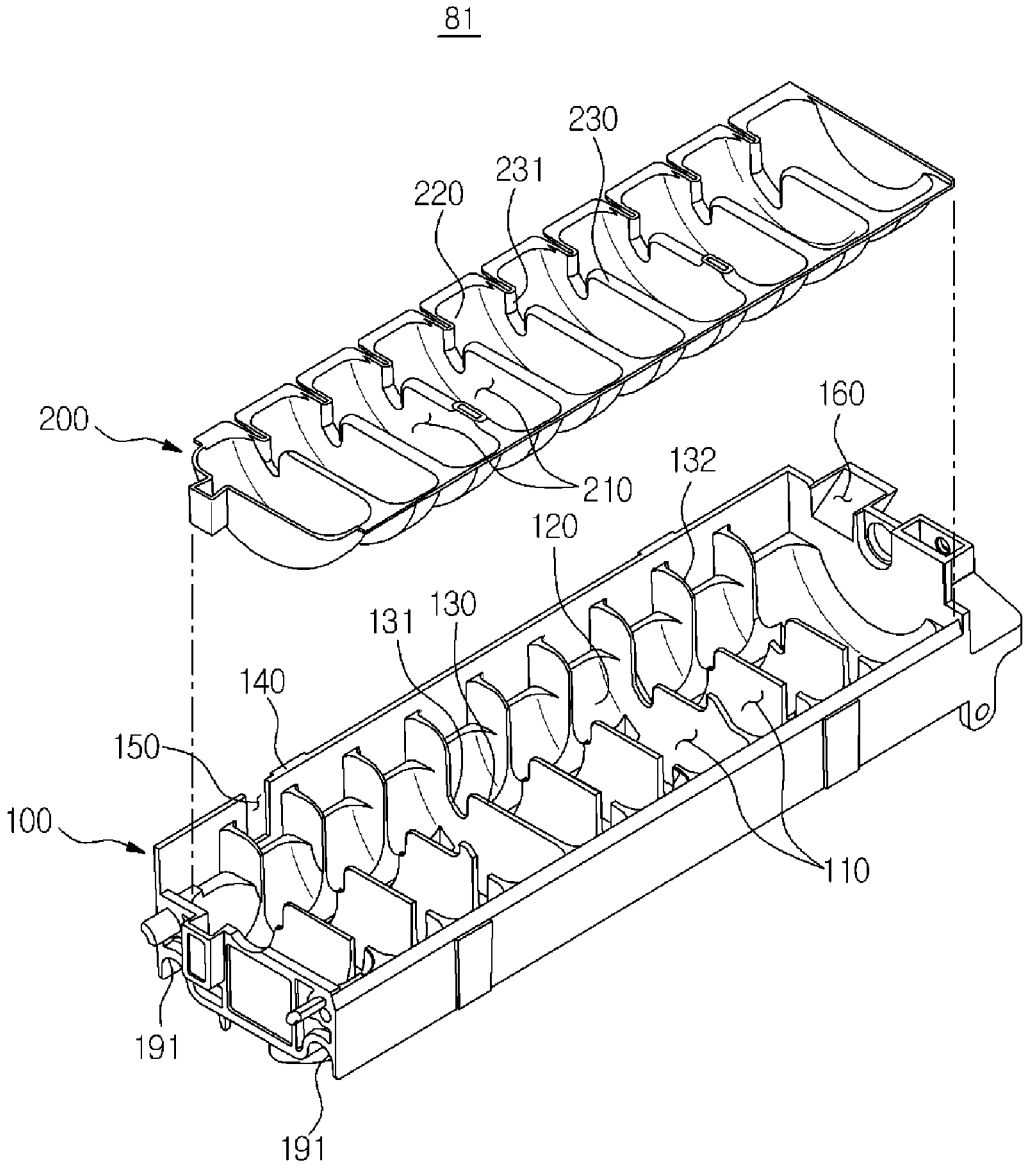
FIG. 4 is an exploded view illustrating an ice-making tray of the refrigerator of FIG. 1.
Figure 5:
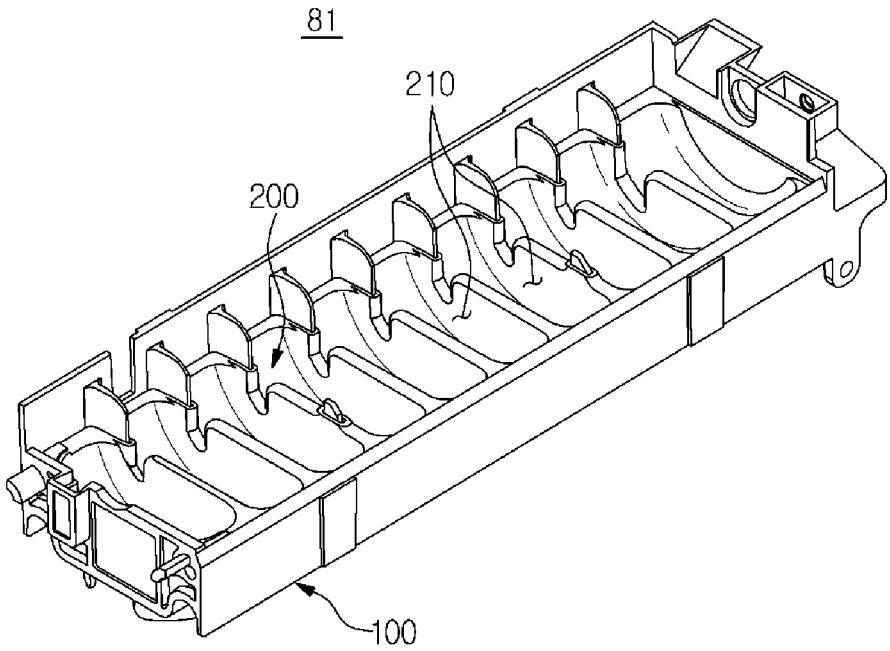
FIG. 5 is a view illustrating an assembled ice-making tray of the refrigerator of FIG. 1.
Figure 6:
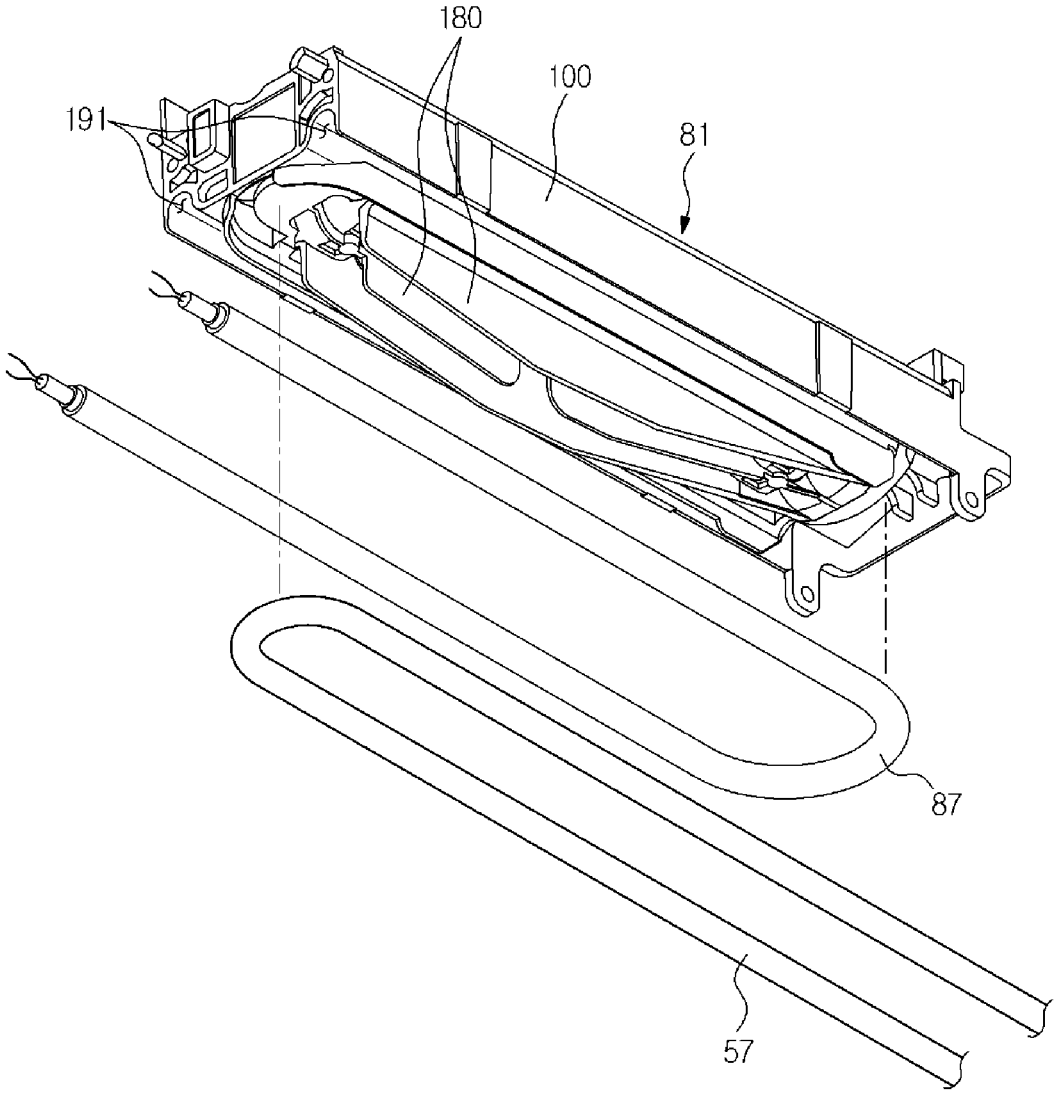
FIG. 6 is a cross-sectional view illustrating a coupling relation among the ice-making tray, a refrigerant pipe, and an ice-separating heater of the refrigerator of FIG. 1.
Figure 7:
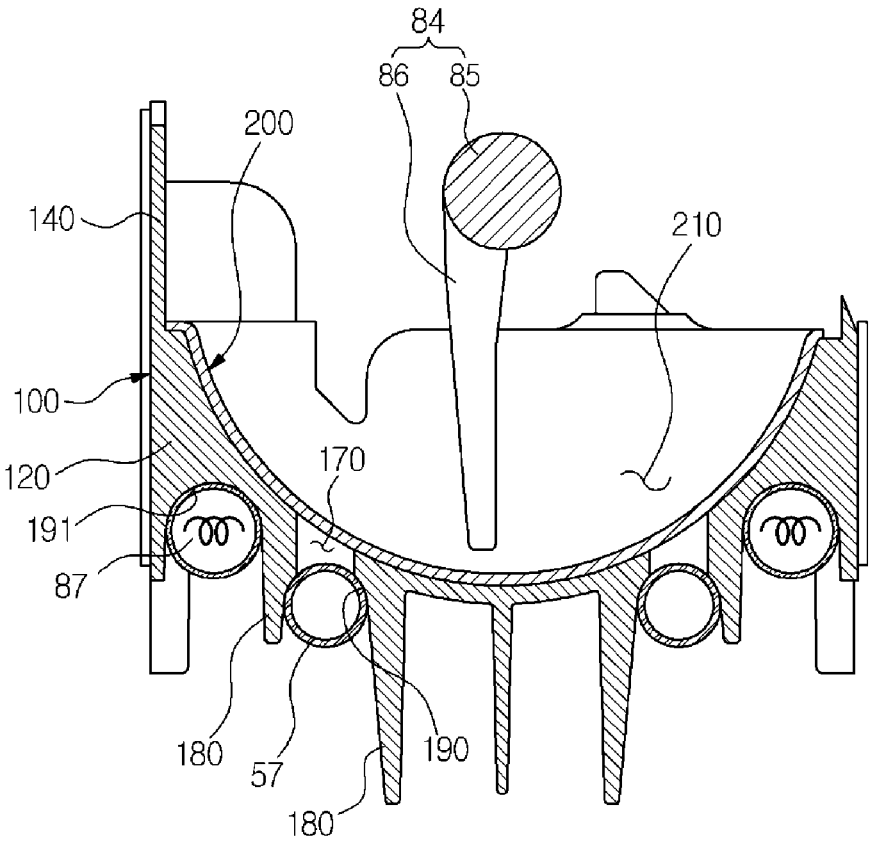
FIG. 7 is a rear perspective view illustrating the coupling relation among the ice-making tray, the refrigerant pipe, and the ice-separating heater of the refrigerator of FIG. 1.
Figure 8:
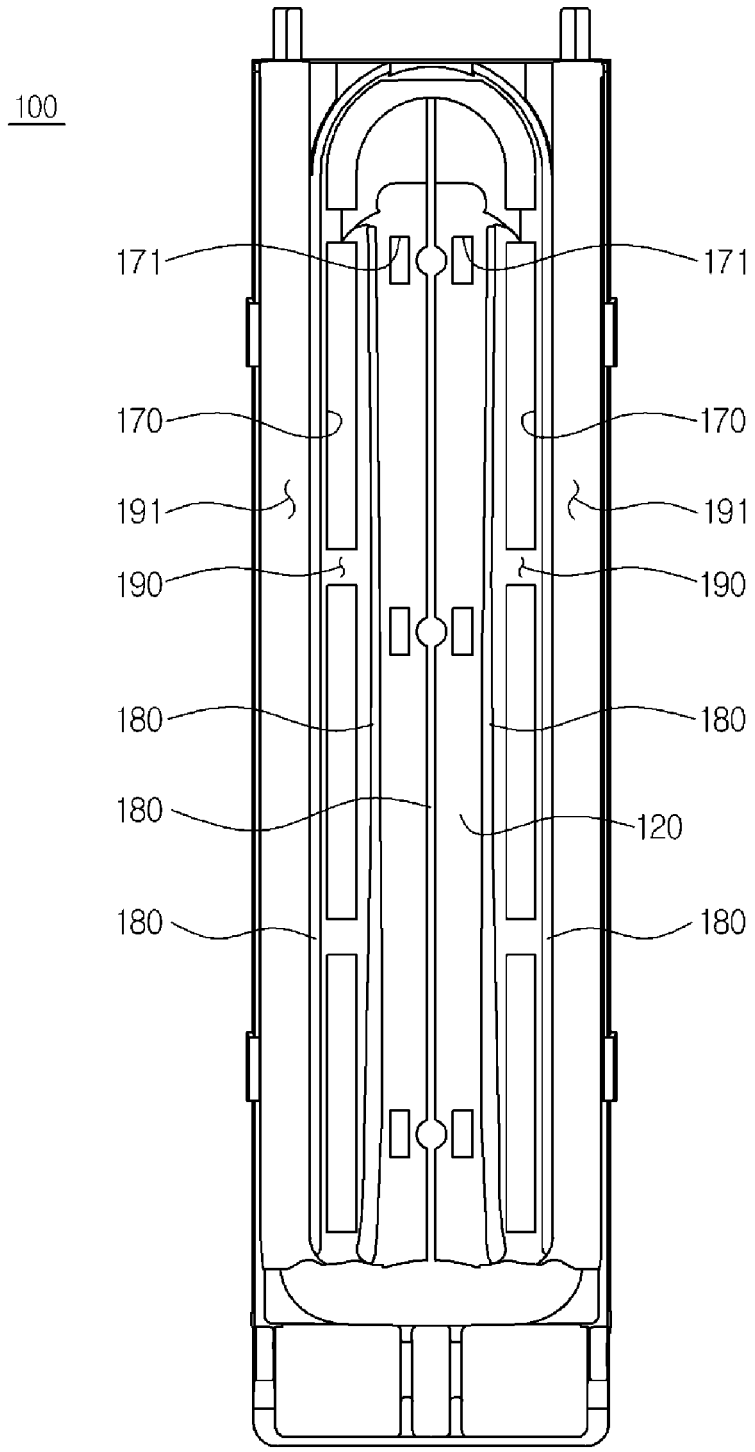
FIG. 8 is a rear view illustrating a first tray at a lower portion of the refrigerator of FIG. 1.

FIG. 4 is an exploded view illustrating an ice-making tray of the refrigerator of FIG. 1, FIG. 5 is a view illustrating an assembled ice-making tray of the refrigerator of FIG. 1, FIG. 6 is a cross-sectional view illustrating a coupling relation among the ice-making tray, a refrigerant pipe, and an ice-separating heater of the refrigerator of FIG. 1, FIG. 7 is a rear perspective view illustrating the coupling relation among the ice-making tray, the refrigerant pipe, and the ice-separating heater of the refrigerator of FIG. 1, and FIG. 8 is a rear view illustrating a first tray at a lower portion of the refrigerator of FIG. 1.

Referring to FIGS. 4 to 8, the ice-making tray 81 according to an embodiment of the present invention includes the first tray 100 which is in contact with the refrigerant pipe 57, receives cooling energy from the refrigerant pipe 57 by thermal conduction, and is positioned at a lower portion thereof, and a second tray 200 which is coupled to overlap a top surface of the first tray 100 to receive the cooling energy from the first tray 100, and includes at least one ice-making cell 210 which stores ice-making water.

In the above-described structure, cooling energy is sequentially transferred from the refrigerant pipe 57 through the first tray 100 to the second tray 200, ice-making water stored in the ice-making cell 210 of the second tray 200 may be cooled, and ice may be generated.

The first tray 100 includes an ice-making cell accommodating part 110 concavely formed to accommodate the ice-making cell 210 of the second tray 200, a first base part 120 forming the ice-making cell accommodating part 110, a separation preventing wall 140 which extends upward from one end in a widthwise direction of the first base part 120 and guides a movement of ice when the ice is separated from the ice-making cells 210, a cutting rib 132 capable of cutting links between ice pieces generated in the ice-making cells 210 when the ice pieces are separated from the ice-making cells 210, a water supply hole 160 provided at one end in a lengthwise direction to receive water, and an excessively supplied water discharge hole 150 which discharges excessively supplied water to the drain duct 83 when the ice-making cell 210 is supplied with water more than a predetermined amount of water.

The ice-making cell accommodating part 110 has a shape corresponding to the ice-making cell 210 to accommodate the ice-making cell 210. The number of ice-making cell accommodating parts 110 are equal to that of the ice-making cells 210. The ice-making cell accommodating parts 110 are partitioned each other by first partition parts 130. First communication parts 131 which enable the ice-making cells 210 to communicate with each other are provided at the first partition parts 130.

At least one heat exchanging rib 180 which expands an area which transfers heat to air in the ice-making chamber 60, and facilitates heat exchange of internal air between the first tray 100 and the ice-making chamber 60 may protrude at a lower portion of the first tray 100.

In addition, a refrigerant pipe accommodating part 190 (see FIG. 6) which accommodates the ice-making chamber refrigerant pipe 57, and an ice-separating heater accommodating part 191 (see FIG. 6) which accommodates the ice-separating heater 87 may be formed at an outside of the lower portion of the first tray 100. Each of the refrigerant pipe accommodating part 190 and the ice-separating heater accommodating part 191 may have a concave shape. The refrigerant pipe accommodating part 190 and the ice-separating heater accommodating part 191 may be formed between the heat exchanging ribs 180.

Each of the ice-making chamber refrigerant pipe 57 and the ice-separating heater 87 may be provided in an approximately U shape, and the refrigerant pipe accommodating part 190 and the ice-separating heater accommodating part 191 of the first tray 100 may also have an approximately U shape to correspond thereto. The refrigerant pipe accommodating part 190 may be provided in the ice-separating heater accommodating part 191.

The refrigerant pipe 57 may be accommodated in the refrigerant pipe accommodating part 190 to be in contact therewith, and the ice-separating heater 87 may be accommodated in the ice-separating heater accommodating part 191 to be in contact therewith.

Such a first tray 100 may be formed of a material having high thermal conductivity to accelerate thermal conduction of cooling energy. For example, the first tray 100 may be formed of an aluminum material. The first tray 100 may be integrally formed.

The second tray 200 may be coupled to be pressed against a top surface of the first tray 100. As the second tray 200 is simply put on the top surface of the first tray 100, the second tray 200 may be coupled to the first tray 100.

The second tray 200 may include the at least one ice-making cell 210 which stores ice-making water, a second base part 220 forming the at least one ice-making cell 210, second partition parts 230 which partition the ice-making cells 210 from each other, and second communication parts 231 which enable the ice-making cells 210 to communicate with each other to supply water to all of the ice-making cells 210 when the water is supplied.

When the ice-making speed of ice-making water is excessively high, a gas such as oxygen or carbon dioxide and other impurities melted in the ice-making water are not discharged, and a turbidity phenomenon in which ice is turbid may occur.

In order to solve the above-described turbidity phenomenon, the second tray 200 of the ice-making tray 81 according to an embodiment of the present invention is formed of a material having low thermal conductivity. For example, the second tray 200 may be formed of a plastic material. As a result, as the speed of thermal conduction of cooling energy decreases, the cooling speed of ice-making water may decrease, and accordingly, transparency of ice may be improved.

However, materials of the first tray 100 and the second tray 200 are not respectively limited to an aluminum material and a plastic material, and as long as the second tray 200 is formed of a material which has a lower thermal conductivity than that of the first tray 100, it may be consistent with the scope of the present invention.

That is, materials of the first tray 100 and the second tray 200 may be properly selected as long as the first tray 100 positioned thereunder is formed with a comparatively high thermal conductivity and effectively serves as a heat exchanger which cools the ice-making chamber 60, the second tray 200 positioned thereabove decreases a speed of thermal conduction of cooling energy slightly, and thus ice whose transparency is improved is generated.

The second tray 200 may be integrally formed. Accordingly, since each of the above-described first tray 100 and second tray 200 are formed, and the second tray 200 is simply coupled to overlap the top surface of the first tray 100, the ice-making tray 81 may be easily assembled, and thus all objectives of maintaining cooling performance in the ice-making chamber 60 and improving transparency of ice may be achieved.

In the above description, as the second tray 200 is formed of a material having a lower thermal conductivity than that of the first tray 100, a speed of thermal conduction of cooling energy and a speed of cooling ice-making water may be delayed, but, alternatively or additionally, as a heat transfer area of the ice-making chamber refrigerant pipe 57 and the first tray 100 is decreased, a speed of thermal conduction of cooling energy and a speed of cooling ice-making water may be delayed.

To this end, a heat-transfer-area-reducing hole 170 (see FIGS. 6 and 8) which reduces a heat transfer area of the refrigerant pipe 57 may be formed at a portion in contact with the refrigerant pipe 57 of the first tray 100. That is, the heat-transfer-area-reducing hole 170 may be formed at the refrigerant pipe accommodating part 190 of the first tray 100.

The heat-transfer-area-reducing hole 170 may be formed to penetrate the first base part 120 of the first tray 100. Accordingly, not only a heat transfer area of the refrigerant pipe 57 and the first tray 100 may be decreased but also a heat transfer area of the first tray 100 and the second tray 200 may also be decreased by the heat-transfer-area-reducing hole 170.

At least two or more of the heat-transfer-area-reducing holes 170 may be formed at the refrigerant pipe accommodating part 190 to be spaced apart from each other, or one of the heat-transfer-area-reducing hole 170 may also be continuously formed unlike the present embodiment.

At least one auxiliary hole 171 which decreases the heat transfer area of the first tray 100 and the second tray 200 may be additionally provided at the first base part 120 of the first tray 100 excluding the refrigerant pipe accommodating part 190. As the heat transfer area of the first tray 100 and the second tray 200 is decreased, a speed of thermal conduction of cooling energy from the second tray 200 to the first tray 100 may be delayed, and thus, an ice-making speed of ice-making water may also be delayed.

In addition, the auxiliary hole 171 may drain defrosted water of frost frosted between the first tray 100 and the second tray 200.

With the above-described structure, the ice-making tray 81 may receive cooling energy from the ice-making chamber refrigerant pipe 57 by the direct cooling method, and may quickly generate ice, and ice having improved transparency may be obtained compared to a conventional ice-making tray. In addition, the same cooling performance of the ice-making chamber 60 of the ice-making tray 81 as that of a conventional ice-making tray may be maintained.

Figure 9:
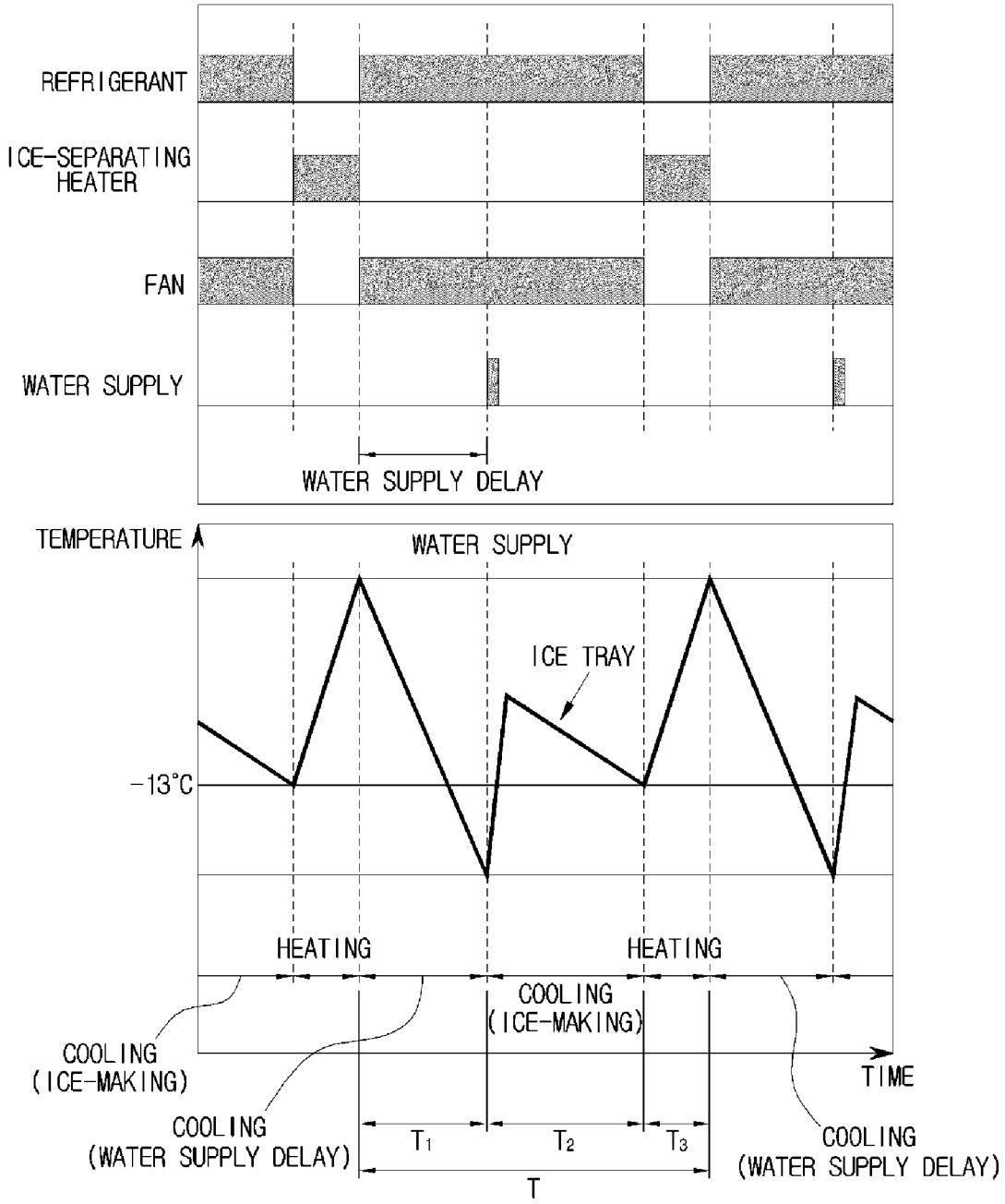
FIGS. 9 and 10 are views for describing a control method of an ice-making process of the refrigerator of FIG. 1.
Figure 10:
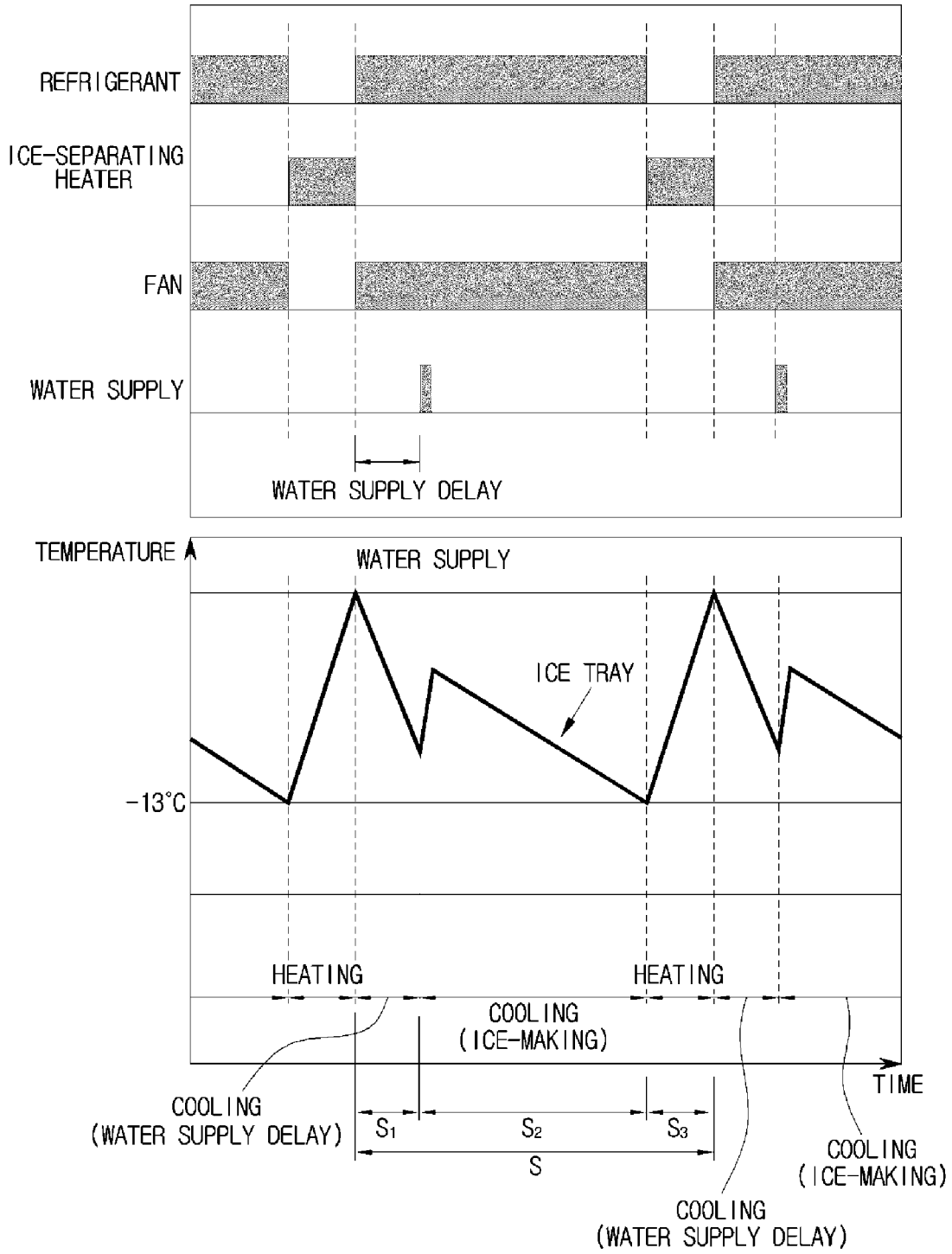

FIGS. 9 and 10 are views for describing a control method of an ice-making process of the refrigerator of FIG. 1.

A control method of an ice-making process of the refrigerator of FIG. 1 will be described with reference to FIGS. 9 and 10. Hereinafter, a control method illustrated in FIG. 9 is referred to as a first control method, and a control method illustrated in FIG. 10 is referred to as a second control method.

As illustrated in FIG. 9, an entire ice-making process of the ice maker may include a first operation (cooling and water supply delay operation), a second operation (cooling and ice-making operation), and a third operation (heating and ice-separating operation).

In the first operation (cooling and water supply delay operation), a refrigerant may be supplied to the ice-making chamber refrigerant pipe 57, and the ice-making chamber fan 97 may be operated. Accordingly, cooling air generated from the ice-making chamber refrigerant pipe 57 may forcibly flow by the ice-making chamber fan 97 to cool the ice-making chamber 60.

When a predetermined water supply delay time is passed, the second operation (cooling and ice-making operation) may start.

Water may be supplied to the ice-making tray 81 at an initial stage of the second operation (cooling and ice-making operation). In the second operation (cooling and ice-making operation), a refrigerant may be supplied to the ice-making chamber refrigerant pipe 57, and the ice-making chamber fan 97 may be operated. Accordingly, a part of cooling air generated in the ice-making chamber refrigerant pipe 57 may be transferred to the ice-making tray 81, and make ice with the water supplied to the ice-making tray 81, and the remaining part may cool the inner portion of the ice-making chamber 60.

When the ice making is completed with the water supplied to the ice-making tray 81, the third operation (heating and ice-separating operation) may start.

In the third operation (heating and ice-separating operation), supply of the refrigerant to the ice-making chamber refrigerant pipe 57 may stop, the operation of the ice-making chamber fan 97 may stop, and the ice-separating heater 87 may generate heat. When ice adhered to the ice-making tray 81 is slightly melt by heat generated from the ice-separating heater 87, the ice separating motor 82 may be operated and the ejector 84 may rotate. As the ejector 84 rotates, the ice in the ice-making tray 81 may be separated from the ice-making tray 81 to fall into the ice bucket 90.

A cycle of the entire ice-making process (ice-separating cycle T) of the ice maker may correspond to a sum of a first operation operating time T1, a second operation operating time T2, and a third operation operating time T3.

Although an operating time S2 of a second operation (cooling and ice-making operation) of the second control method illustrated in FIG. 10 may be greater than that of the first control method illustrated in FIG. 9, a cycle of the entire ice-making process (ice-separating cycle S) may be the same as that of the first control method (S2>T2, S=T).

The reason is that an operating time S1 of a first operation (cooling and water supply delay operation) of the second control method is less than the operating time T1 of the first operation (cooling and water supply delay operation) of the first control method (S1<T1). Operating times of third operations (heating and ice-separating operation) in the first control method and the second control method are assumed to be the same (S3=T3).

That is, when an ice-making speed is delayed, the operating time of the second operation (cooling and ice-making operation) is increased, and at this time, by decreasing the operating time of the first operation (cooling and water supply delay operation), the same cycle of the entire ice-making process may be maintained.

In addition, although the operating time of the first operation (cooling and water supply delay operation) in the second control method is decreased as described above, cooling performance of the ice-making chamber 60 is not lowered compared to that of the first control method. The reason is that cooling of the ice-making chamber 60 is performed at both of the first operation (cooling and water supply delay operation) and the second operation (cooling and ice-making operation), and sums of the operating times of the first operations (cooling and water supply delay operation) and the operating times of the second operations (cooling and ice-making operation) in the first control method and the second control method are the same (S1+S2=T1+T2).

That is, in the first control method and the second control method, cooling energy generated from the ice-making chamber refrigerant pipe 57 during the entire operating times of the first operation and the second operation may be the same, cooling energy, among the cooling energy, which is used for ice making with water of the ice-making tray 81 may be the same, and as a result, cooling energy used for cooling the ice-making chamber 60 may also be the same.

As a result, since the ice-making tray 81 according to an embodiment of the present invention is provided to decrease an ice-making speed to improve the transparency of ice, the cycle of the entire ice-making process (ice-separating cycle) may be maintained in the same extent compared to a conventional process as well as the transparency of ice is improved through a control method which decreases the operating time of the first operation (cooling and water supply delay operation) compared to the conventional process.

Figure 11:
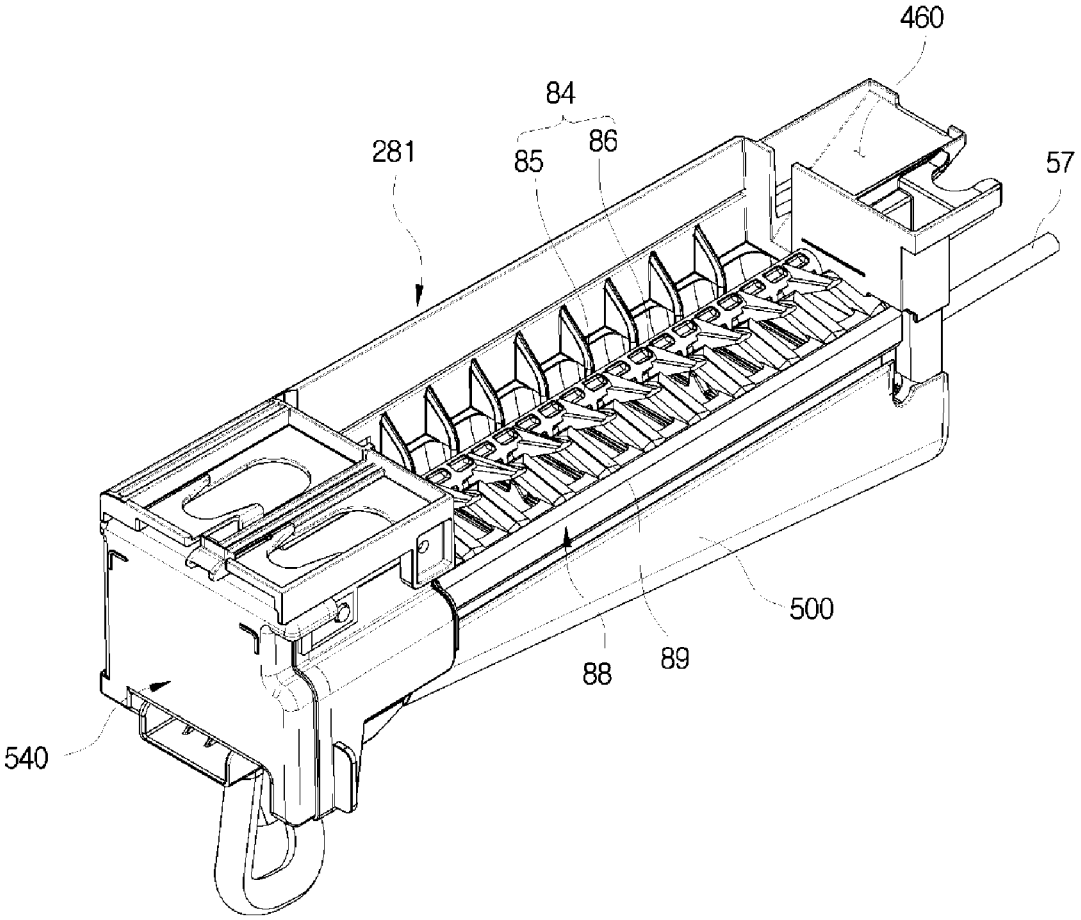
FIG. 11 is a view illustrating an ice maker according to a second embodiment of the present invention.
Figure 12:
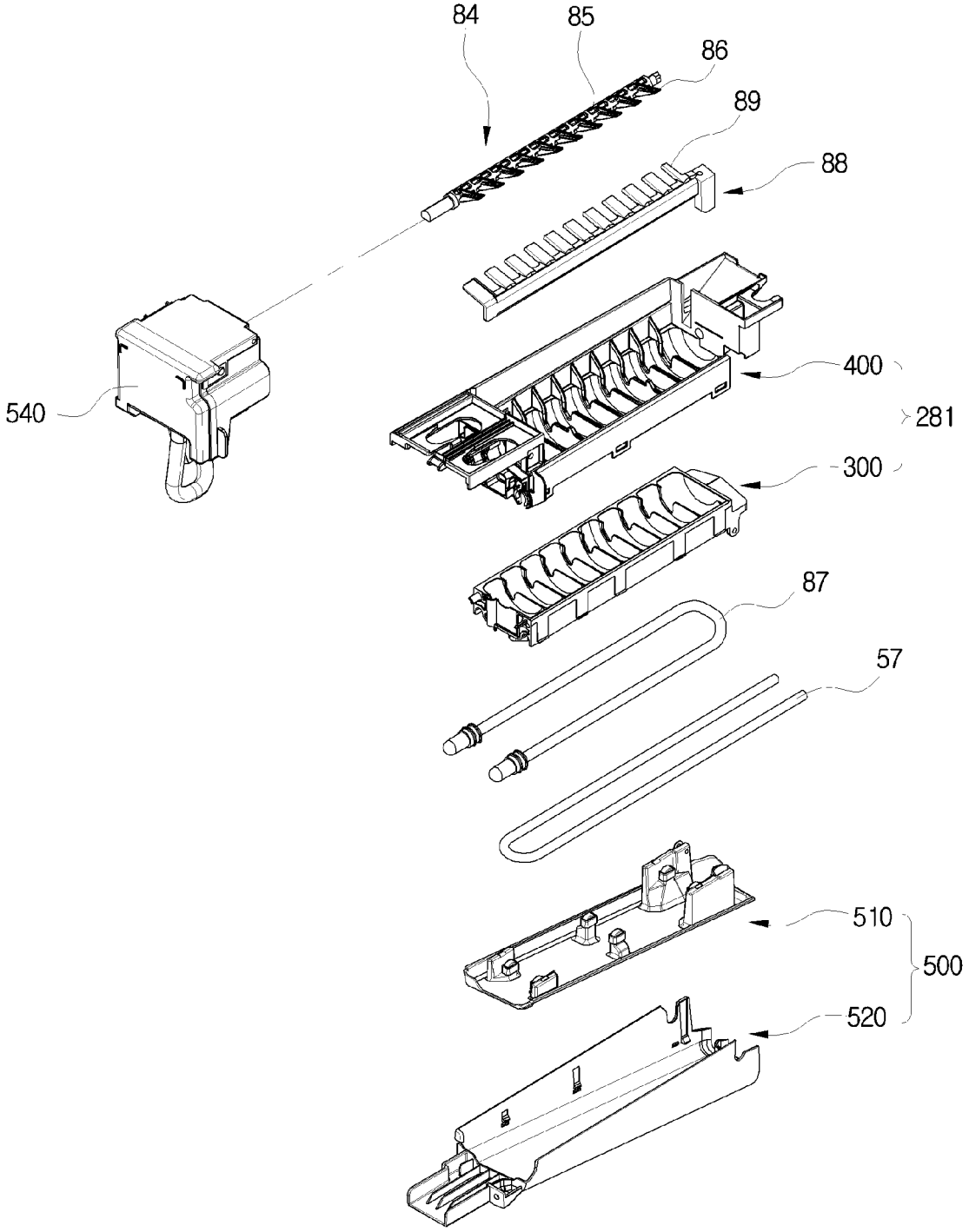
FIG. 12 is an exploded view illustrating the ice maker of FIG. 11.
Figure 13:
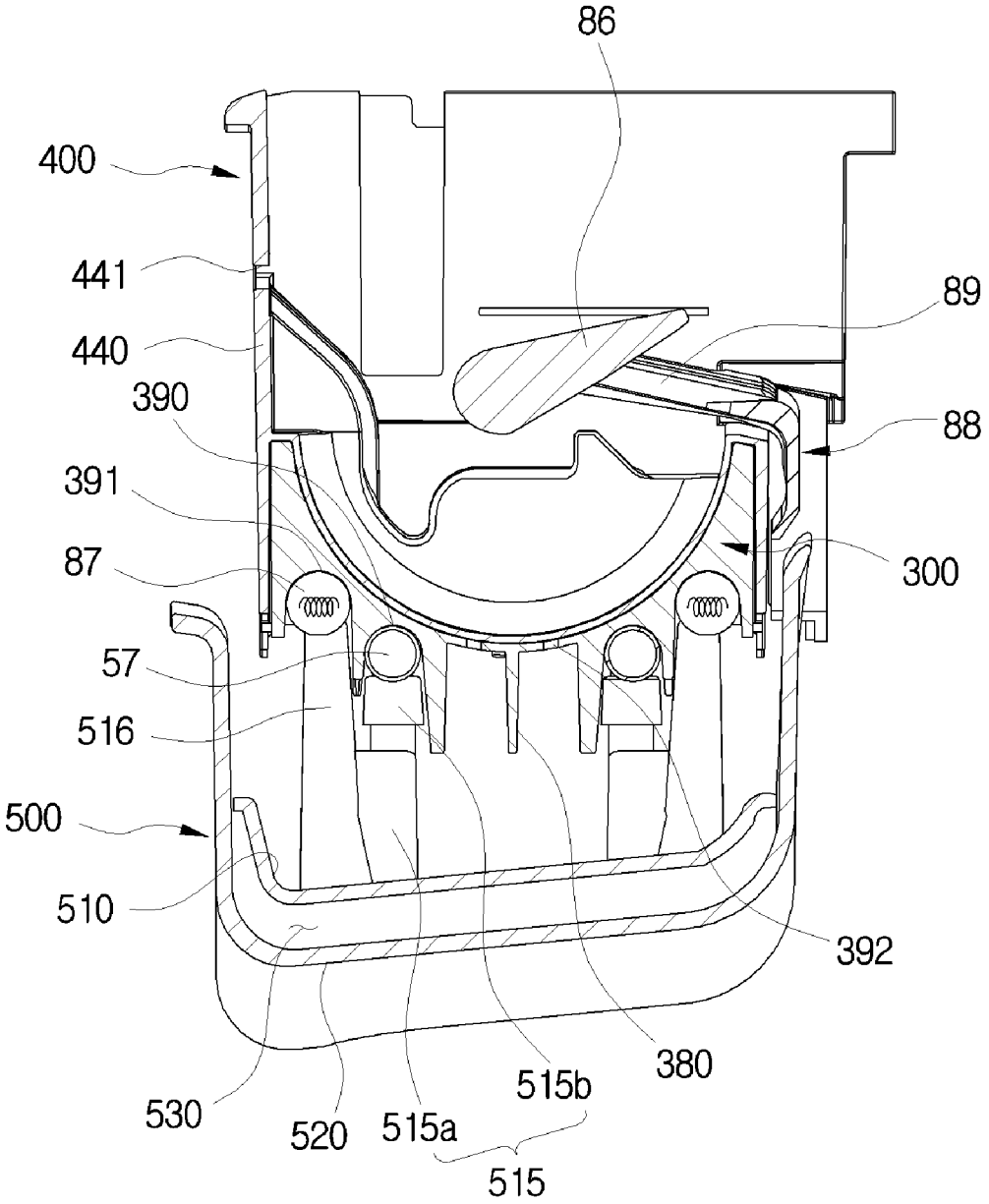
FIG. 13 is a cross-sectional view illustrating the ice maker of FIG. 11.
Figure 14:
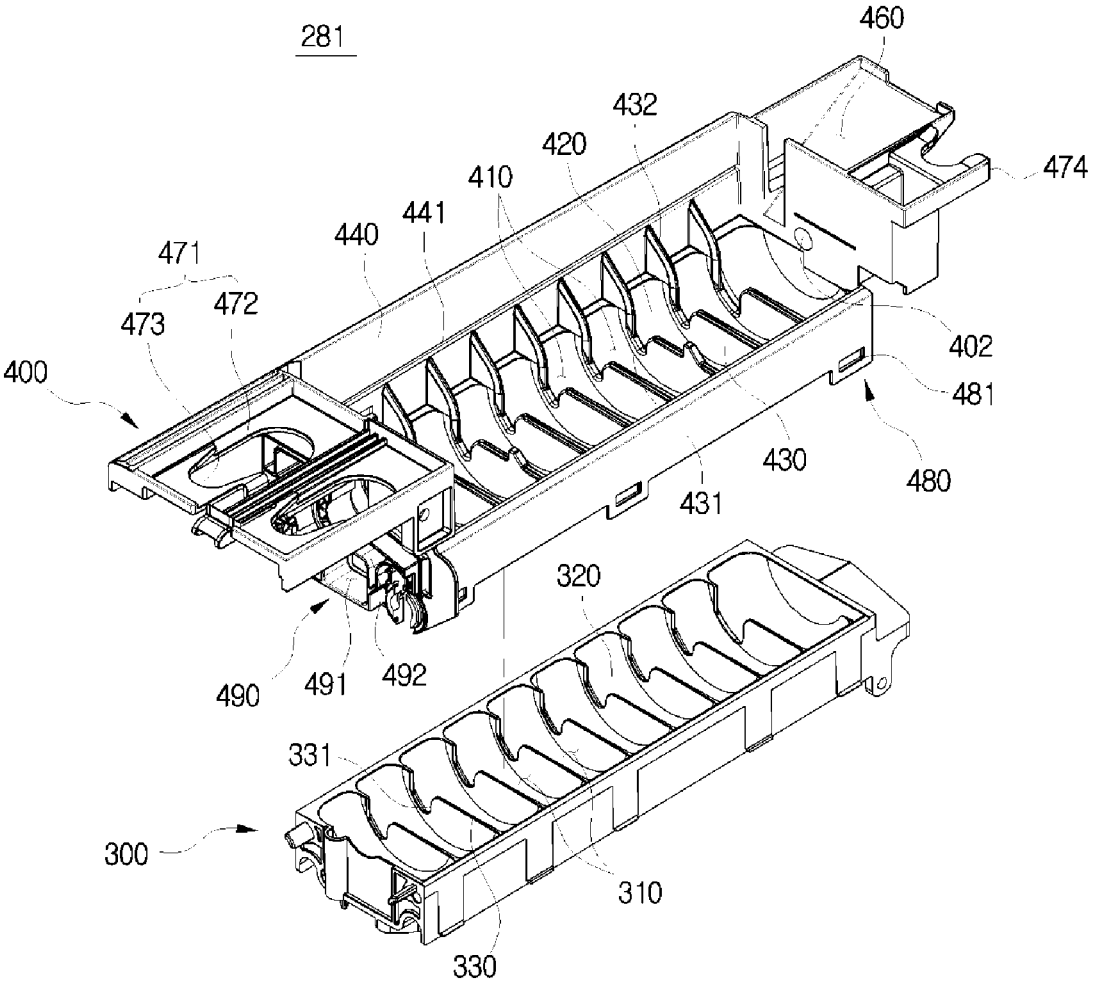
FIGS. 14 and 15 are top exploded perspective views illustrating an ice-making tray of the ice maker of FIG. 11.
Figure 15:
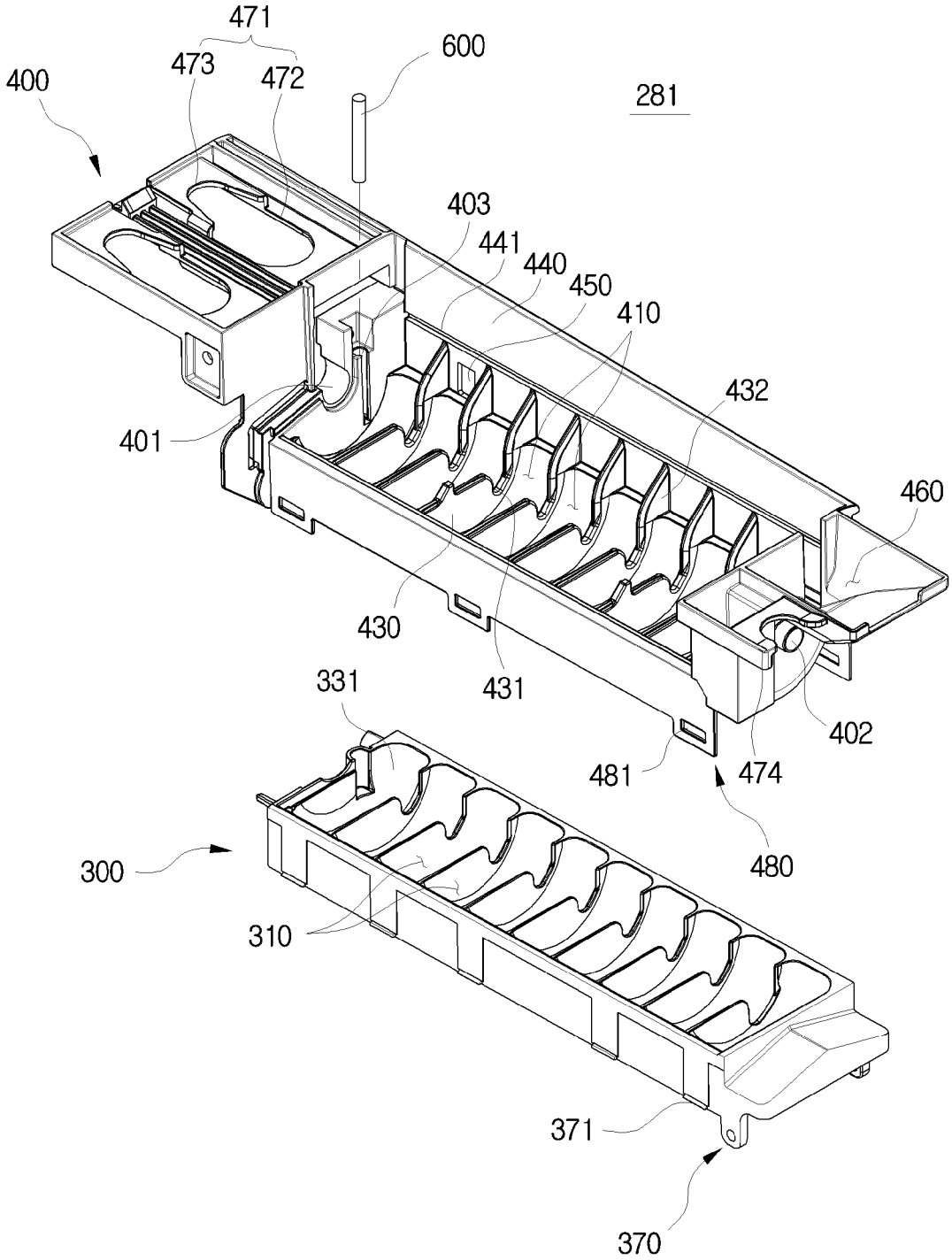
Figure 16:
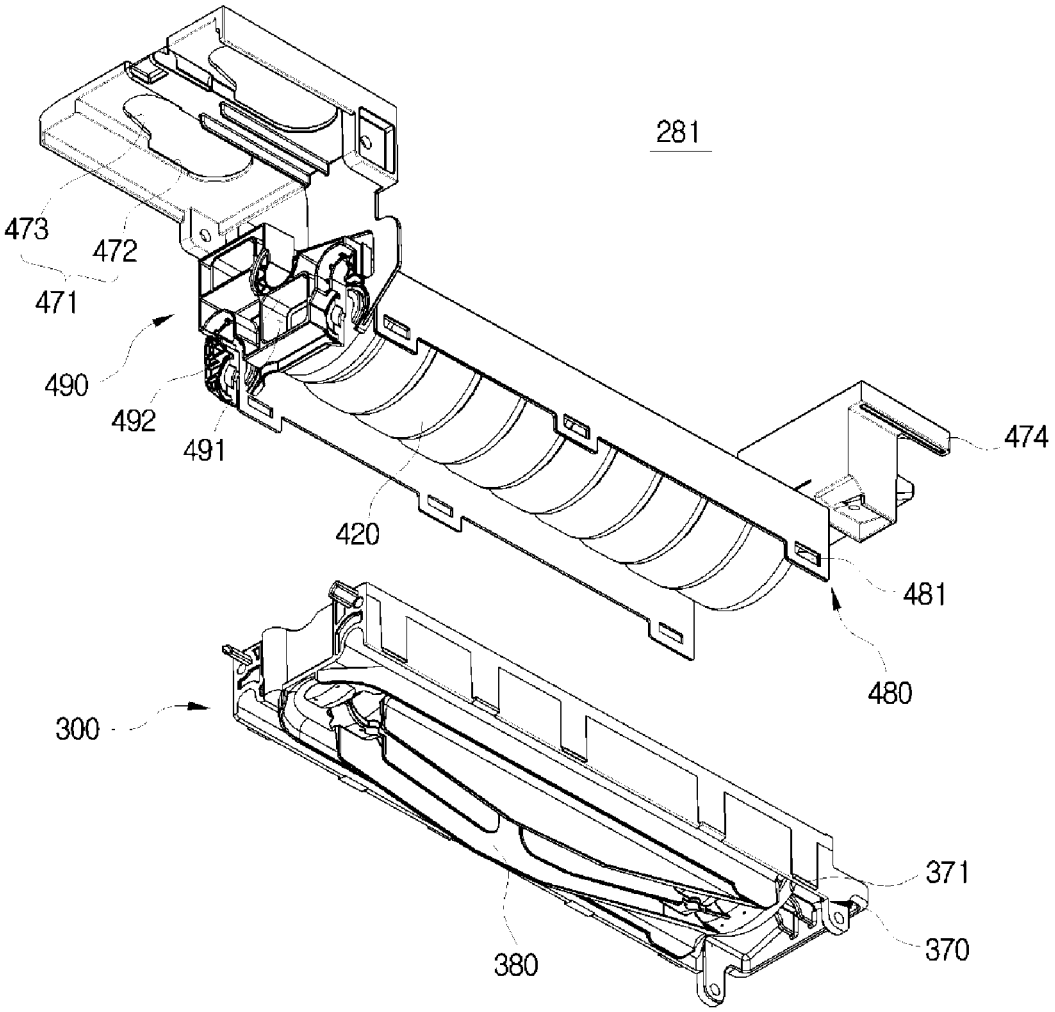
FIG. 16 is a bottom exploded perspective view illustrating the ice-making tray of the ice maker of FIG. 11.
Figure 17:
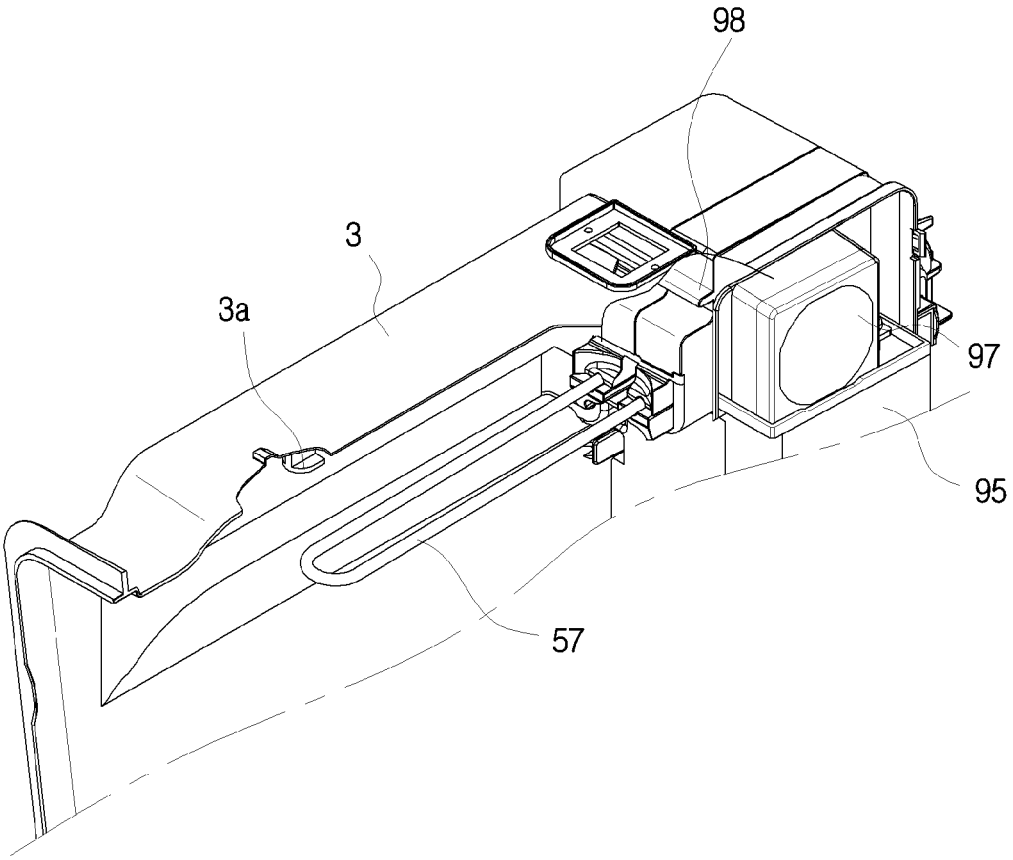
FIG. 17 is a view for describing a structure of an ice-making chamber for coupling the ice-making tray of FIG. 11 to the ice-making chamber.
Figure 18:
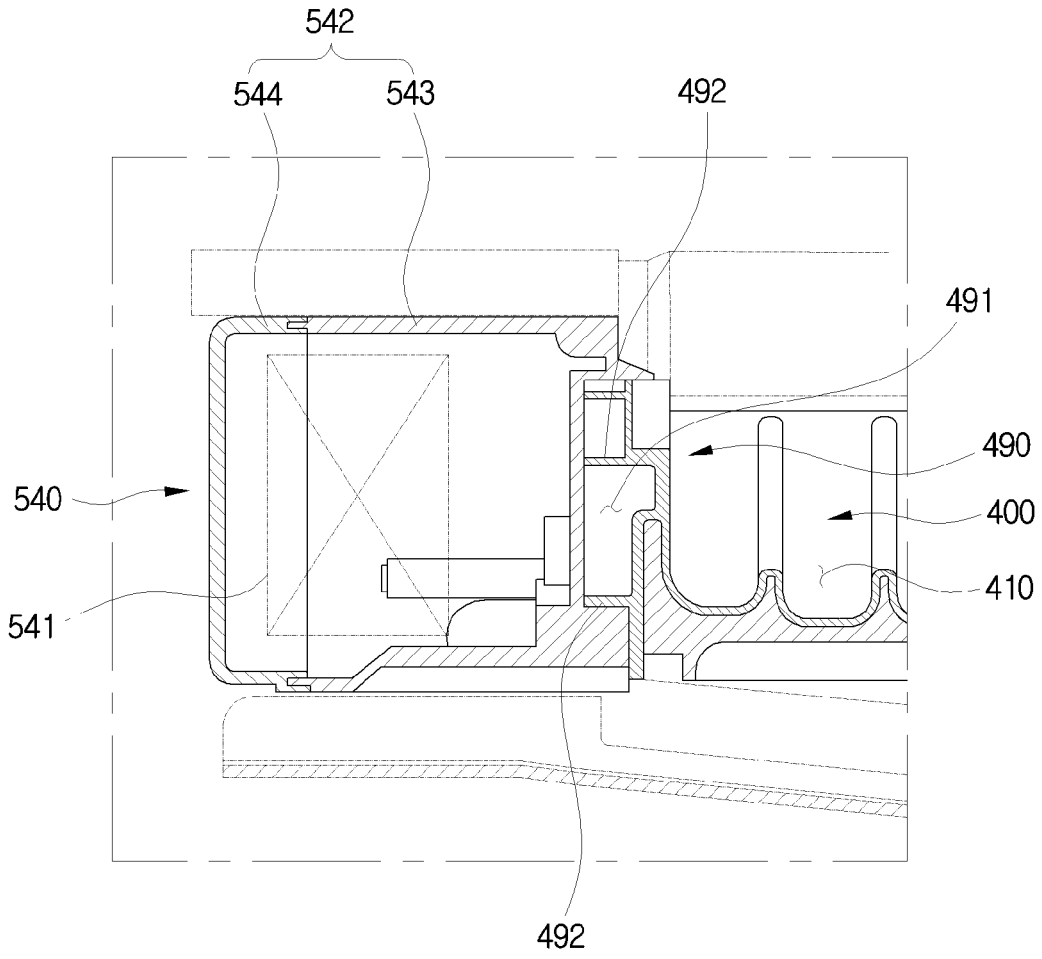
FIG. 18 is a cross-sectional view for describing an air insulating part of the ice-making tray of FIG. 11.
Figure 19:
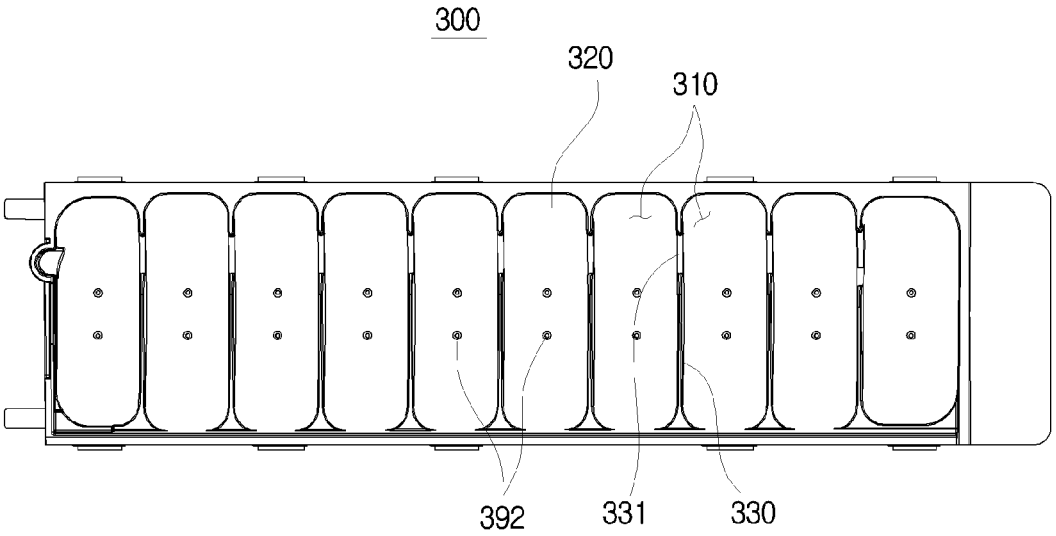
FIG. 19 is a plan view illustrating a lower portion tray of the ice-making tray of FIG. 11.

FIG. 11 is a view illustrating an ice maker according to a second embodiment of the present invention, FIG. 12 is an exploded view illustrating the ice maker of FIG. 11, FIG. 13 is a cross-sectional view illustrating the ice maker of FIG. 11, FIGS. 14 and 15 are top exploded perspective views illustrating an ice-making tray of the ice maker of FIG. 11, FIG. 16 is a bottom exploded perspective view illustrating the ice-making tray of the ice maker of FIG. 11, FIG. 17 is a view for describing a structure of an ice-making chamber for coupling the ice-making tray of FIG. 11 to the ice-making chamber, FIG. 18 is a cross-sectional view for describing an air insulating part of the ice-making tray of FIG. 11, and FIG. 19 is a plan view illustrating a lower portion tray of the ice-making tray of FIG. 11.

An ice maker according to a second embodiment of the present invention will be described with reference to FIGS. 11 to 19. The same reference number as the first embodiment refers to the same component in the drawings and the detail description may be omitted.

An ice maker may include an ice-making tray 281 which stores and cools ice-making water to generate ice, an ejector 84 which separates ice from the ice-making tray 281, an ice separating motor part 540 which rotates the ejector 84, a slider 88 having a guide 89 formed to be inclined to guide ice separated by the ejector 84 to one side in a widthwise direction of the ice-making tray 281, an ice-separating heater 87 which heats the ice-making tray 281 to easily separate ice when the ice is separated from the ice-making tray 281, an ice bucket 90 which stores ice generated from the ice-making tray 281, and a drain duct 500 which collects defrosted water of the ice-making tray 281 and simultaneously guides an air flow in an ice-making chamber 60.

The ice-making tray 281 includes a first tray 300 which is in contact with a refrigerant pipe 57, receives cooling energy from the refrigerant pipe 57 by thermal conduction, and is positioned at a lower portion thereof, and a second tray 400 which is coupled to overlap a top surface of the first tray 300 to receive cooling energy from the first tray 300, and includes at least one ice-making cell 410 which stores ice-making water.

Since the first tray 300 is provided under the second tray 400, the first tray 300 may be referred to as a lower tray, and the second tray 400 may be referred to as an upper tray.

Cooling energy generated from the refrigerant pipe 57 is transferred through the first tray 300 to the second tray 400, ice-making water stored in the ice-making cell 410 of the second tray 400 may be cooled, and ice may be generated.

The first tray 300 may include an ice-making cell accommodating part 310 concavely formed to accommodate the ice-making cell 410 of the second tray 400, and a first base part 320 forming the ice-making cell accommodating part 310.

The ice-making cell accommodating part 310 of the first tray 300 may have a shape corresponding to the ice-making cell 410 to accommodate the ice-making cell 410 of the second tray 400. The number of ice-making cell accommodating parts 310 may be equal to that of the ice-making cells 410. The ice-making cell accommodating parts 310 may be partitioned from each other by first partition parts 330. First communication parts 331 which enable the ice-making cells 410 to communicate with each other may be provided at the first partition parts 330. Ice-making water may be sequentially supplied to the adjacent ice-making cells 410 through the first communication parts 331.

At least one heat exchanging rib 380 which expands an area which transfers heat to air in the ice-making chamber 60, and facilitates heat exchange of internal air between the first tray 300 and the ice-making chamber 60 may protrude at a lower portion of the first tray 300.

A refrigerant pipe accommodating part 390 (see FIG. 13) which accommodates the ice-making chamber refrigerant pipe 57, and an ice-separating heater accommodating part 391 (see FIG. 13) which accommodates the ice-separating heater 87 may be formed at an outside of the lower portion of the first tray 300. Each of the refrigerant pipe accommodating part 390 and the ice-separating heater accommodating part 391 may have a concave shape. The refrigerant pipe accommodating part 390 and the ice-separating heater accommodating part 391 may be formed between the heat exchanging ribs 380.

Each of the ice-making chamber refrigerant pipe 57 and the ice-separating heater 87 may be provided in an approximately U shape (see FIG. 12), and the refrigerant pipe accommodating part 390 and the ice-separating heater accommodating part 391 of the first tray 300 may also have an approximately U shape to correspond thereto. The refrigerant pipe accommodating part 390 may be provided in the ice-separating heater accommodating part 391.

The refrigerant pipe 57 may be accommodated in the refrigerant pipe accommodating part 390 to be in contact with the first tray 300, and the ice-separating heater 87 may be accommodated in the ice-separating heater accommodating part 391 to be in contact with the first tray 300.

The first tray 300 may be formed of a material having high thermal conductivity to accelerate thermal conduction of cooling energy. For example, the first tray 300 may be formed of an aluminum material. The first tray 300 may be integrally formed.

Drain holes 392 (see FIGS. 13 and 19) which drain defrosted water of frost frosted between the first tray 300 and the second tray 400 may be formed at the first tray 300. The drain hole 392 may be formed at each of the ice-making cell accommodating parts 310 of the first tray 300.

The above-described drain hole 392 may decrease a heat transfer area of the first tray 300 and the second tray 400, and may serve as a function which decreases an ice-making speed similar to the auxiliary hole 171 (see FIG. 8).

The second tray 400 may be coupled to be pressed against the top surface of the first tray 300. As the second tray 400 is simply put on the top surface of the first tray 300, the second tray 400 may be coupled to the first tray 300.

However, a first coupling part 370 may be provided at the first tray 300 and a second coupling part 480 may be provided at the second tray 400 to increase a coupling force between the first tray 300 and the second tray 400.

The first coupling part 370 and the second coupling part 480 may be respectively provided at a side surface of the first tray 300 and a side surface of the second tray 400. The first coupling part 370 and the second coupling part 480 may be elastically coupled to each other. The first coupling part 370 may include a coupling protrusion 371 (see FIG. 15) and the second coupling part 470 may include a coupling groove 481 (see FIG. 15) to which the coupling protrusion 371 is coupled.

The second tray 400 may include the at least one ice-making cell 410 which stores ice-making water, a second base part 420 forming the at least one ice-making cell 410, second partition parts 430 which partition the ice-making cells 410 from each other, and second communication parts 431 which enable the ice-making cells 410 to communicate with each other to supply water to all of the ice-making cells 410 when the water is supplied.

The second tray 400 may include a separation preventing wall 440 which extends upward from one end of a side surface in a widthwise direction of the second base part 420 to guide a movement of ice when the ice is separated from the ice-making cell 410. When the ejector 84 rotates and lifts ice of the ice-making cell 410, the separation preventing wall 440 may prevent the ice from falling to the other side opposite to one side in which the slider 88 is provided (see FIG. 13). A slit 441 which prevents heat from vertically transferring through the separation preventing wall 440 may be formed at the separation preventing wall 440. The slit 441 may be formed long in a horizontal direction at the separation preventing wall 440.

The second tray 400 may include cutting ribs 432 which cut links between ice pieces generated in the ice-making cells 410 when the ice pieces are separated from the ice-making cell 410.

The second tray 400 may include a water supplying hole 460 provided at one end in a lengthwise direction to supply water to the ice-making cell 410. As the second tray 400 is provided to be inclined, water introduced through the water supplying hole 460 may be sequentially supplied from the ice-making cell 410 most adjacent to the water supplying hole 460 to the ice-making cell 410 farthest therefrom.

The second tray 400 may include an excessively supplied water discharge hole 450 (see FIG. 15) which discharges excessively supplied water through the drain duct 500 when the ice-making cell 410 is supplied with water more than a predetermined amount of water. The excessively supplied water discharge hole 450 may be formed at one position of the separation preventing wall 440.

The second tray 400 may include a structure which supports the ejector 84, which separates ice generated in the ice-making cell 410. The second tray 400 may include rotating shaft accommodating parts 401 and 402 which rotatably accommodate a rotating shaft 85 of the ejector 84. The rotating shaft accommodating parts 401 and 402 may be respectively formed at a front end and a rear end of the second tray 400 in a lengthwise direction.

The second tray 400 may include a temperature sensor accommodating part 403 which accommodates a temperature sensor 600 which measures temperature of water or ice accommodated in the ice-making cell 410. The temperature sensor accommodating part 403 may be formed at one end of the second tray 400 in a lengthwise direction, and accordingly, the temperature sensor 600 may measure temperature of water or ice accommodated in the ice-making cell 410 most adjacent to the one end of the second tray 400 in a lengthwise direction.

The second tray 400 may include an air insulating part 490 which insulates the ice-making tray 281 from an ice separating motor 541 (see FIGS. 16 and 18). Since the air insulating part 490 insulates the ice-making tray 281 from the ice separating motor 541, malfunction of the ice separating motor 541 and unnecessary heat loss may be prevented.

The air insulating part 490 may include an air wall part 492 which protrudes from a front end of the second tray 400 in a lengthwise direction, and an air accommodating part 491 formed in the air wall part 492. A side surface of the air wall part 492 may be formed in a closed loop shape, and a front surface of the air wall part 492 may be open. The open front surface of the air wall part 492 may be closed by an ice separating motor case 541 which accommodates the ice separating motor 541. Accordingly, an inner portion of the air accommodating part 491 may be a closed space. As the air accommodating part 491 is filled with air, the air accommodating part 491 may insulate the ice-making tray 281 from the ice separating motor 541.

The ice separating motor case 542 may be formed by coupling a front case 544 and a rear case 543, and the air wall part 492 may be provided to be pressed against the rear case 543. An ice separating motor part 540 may include the ice separating motor 541 and the ice separating motor case 541.

The second tray 400 may include a fixing part which fixes the ice-making tray 281 in the ice-making chamber 60. That is, the ice-making tray 281 may be directly fixed in the ice-making chamber 60 without an additional fixing member.

The fixing part may couple the second tray 400 to a ceiling of an inner box 3 (see FIG. 17) of the ice-making chamber 60. To this end, the fixing part may include a groove part 471 coupled to a hook part 3a provided at the ceiling of the inner box 3 of the ice-making chamber 60.

The groove part 471 may include a large diameter part 472 which is comparatively large, and a small diameter part 473 which is comparatively small. The large diameter part 472 may have a size through which the hook part 3a may enter, and the small diameter part 473 may have a size through which the hook part 3a, which passed through the large diameter part 472, may not move out.

When the ice-making tray 281 is inserted into the ice-making chamber 60, the hook part 3a may be inserted into the large diameter part 472 of the second tray 400, and may move toward the small diameter part 473. Since the hook part 3a which moves toward the small diameter part 473 is not separated from the small diameter part 473, the ice-making tray 281 may be fixed to the ice-making chamber 60.

The fixing part may include a mounting part 474 in which the second tray 400 is put on a supporting part 98 provided at the ice-making chamber 60 and is supported thereby. The supporting part 98 may also be integrally formed with the inner box 3 of the ice-making chamber 60, and may also be formed in a separate structure provided in the ice-making chamber 60.

The above-described fixing part may be formed at a front outside or a rear outside of an upper portion of the ice-making cell 410 of the second tray 400. That is, the upper portion of the ice-making cell 410 of the second tray 400 may be open. The reason is that injection molding of the second tray 400 in which the fixing part is integrally formed is performed easily. When the fixing part is not positioned at an outside of the upper portion of the ice-making cell 410 of the second tray 400 but is positioned at a direct upper portion thereof, it may not be easy to inject the second tray 400 using a general mold.

In the above-described structure, according to an embodiment of the present invention, an ice-making speed of the ice-making tray 281 is delayed and transparency of ice is improved. In addition, components of related parts of the ice-making tray 281 are integrally formed with the ice-making tray 281, the number of components is decreased, and thus performance of assembly and productivity may be improved.

The drain duct 500 may be provided under the ice-making tray 281 and collect defrosted water fallen from the ice-making tray 281 or the ice-making chamber refrigerant pipe 57. A flow path for cold air may be formed between the ice-making tray 281 and the drain duct 500.

The drain duct 500 may include a drain plate 510 which collects defrosted water, and a frost preventing cover 520 which surrounds a lower portion of the drain plate 510 to prevent freezing of the drain plate 510.

The drain plate 510 may be disposed to be inclined such that collected water flows toward a drain hole.

The drain plate 510 may include a refrigerant pipe fixing part 515 which presses the ice-making chamber refrigerant pipe 57 and presses and fixes the ice-making chamber refrigerant pipe 57 against and to the bottom surface of the first tray 300. The refrigerant pipe fixing part 515 may include a protrusion 515a which protrudes upward from the drain plate 510, and an elastic part 515b provided at an end portion of the protrusion 515a. The elastic part 515b may be formed of a rubber material. Since the elastic part 515b has an elastic force, the elastic part 515b smoothly presses the ice-making chamber refrigerant pipe 57, and accordingly, prevents damage of the ice-making chamber refrigerant pipe 57 from impact. In addition, the elastic part 515b may prevent cold air from being directly transferred from the ice-making chamber refrigerant pipe 57 to the drain plate 510, and may prevent frost from occurring at the drain plate 510.

The drain plate 510 may include an ice-separating heater contact part 516 which is in contact with the ice-separating heater 87, fixes the ice-separating heater 87, and receives heat from the ice-separating heater 87. Since heat of the ice-separating heater 87 is transferred through the ice-separating heater contact part 516 to the drain plate 510, frost is prevented from occurring at the drain plate 510, and, even when frost occurs, the frost may be easily defrosted.

The frost preventing cover 520 may be formed of a plastic material having a low thermal conductivity.

An air insulating layer 530 which insulates the drain plate 510 from the frost preventing cover 520 may be formed between the drain plate 510 and the frost preventing cover 520. That is, the drain plate 510 and the frost preventing cover 520 are provided to be spaced a predetermined gap from each other, and air may be filled therebetween.

Figure 20:
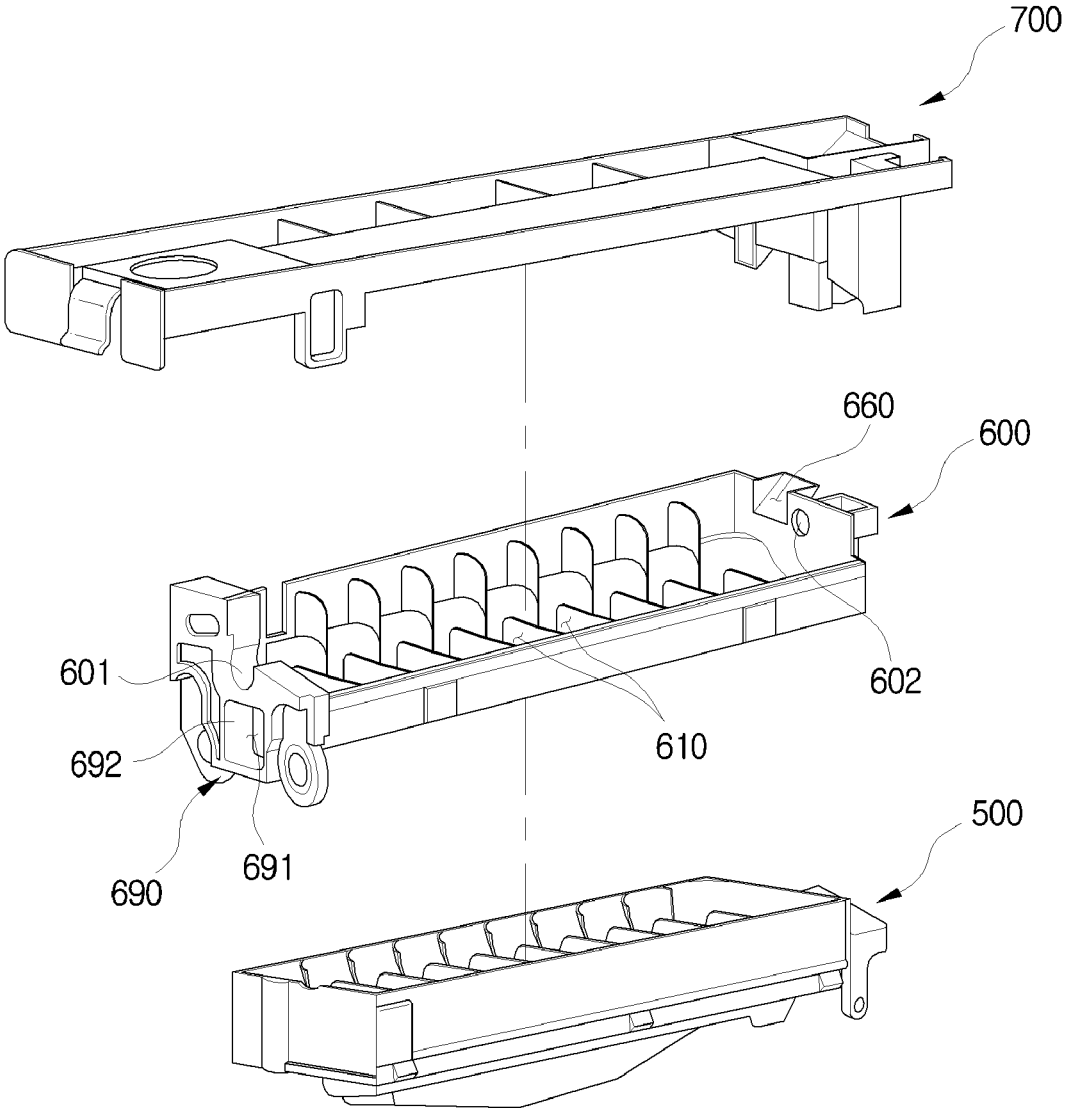
FIG. 20 is a view for describing an ice maker according to a third embodiment of the present invention.
Figure 21:
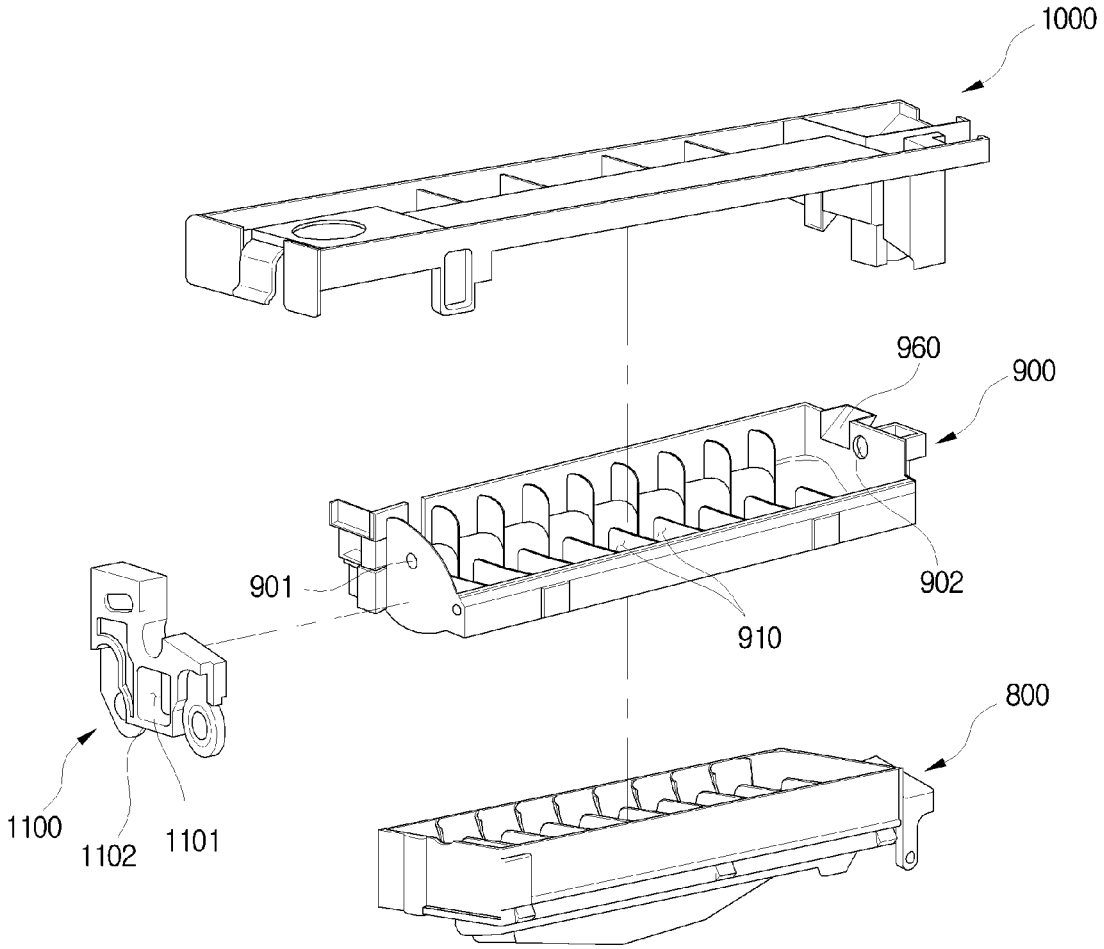
FIG. 21 is a view for describing an ice maker according to a fourth embodiment of the present invention.

FIG. 20 is a view for describing an ice maker according to a third embodiment of the present invention, and FIG. 21 is a view for describing an ice maker according to a fourth embodiment of the present invention.

An ice maker according to third and fourth embodiments of the present invention will be described with reference to FIGS. 20 and 21. Structures which are the same as those of the previously described embodiments may be omitted.

Although the fixing part which fixes the ice-making tray 281 in the ice-making chamber 60, the air insulating part 490 which insulates the ice-making tray 281 from the ice separating motor part 540, the rotating shaft accommodating parts 401 and 402 which rotatably accommodate the rotating shaft 85 of the ejector 84, and the temperature sensor accommodating part 403 which accommodates the temperature sensor 600 are integrally formed in the second tray 400 according to the second embodiment, unlike the above-description, an air insulating part 690 which insulates an ice-making tray from an ice separating motor, rotating shaft accommodating parts 601 and 602 which rotatably accommodate a rotating shaft 85 of an ejector 84, and a temperature sensor accommodating part which accommodates a temperature sensor may be integrally formed in an second tray 600, and a fixing part 700 which fixes the ice-making tray in an ice-making chamber 60 may be separately formed from the second tray 400.

An ice-making cell 610 in which water is stored, and a water supply hole 660 which supplies the water to the ice-making cell 610 may be formed in the second tray 600. The air insulating part 690 may include an air accommodating part 691 which accommodates air, and an air wall part 692 protruding such that the air accommodating part 691 is formed.

A non-described reference character 500 means a first tray coupled to overlap a lower portion of the second tray 600 and transfers cooling energy.

Unlike the above-description, rotating shaft accommodating parts 901 and 902 which rotatably accommodate a rotating shaft 85 of an ejector 84, and a temperature sensor accommodating part which accommodates a temperature sensor may be integrally formed in a second tray 900, and a fixing part 1000 which fixes an ice-making tray in an ice-making chamber 60, an air insulating part 1100 which insulates the ice-making tray from an ice separating motor may also be separately formed from the second tray 900.

An ice-making cell 910 in which water is stored, and a water supply hole 960 which supplies the water to the ice-making cell 910 may be formed in the second tray 900. The air insulating part 1100 may include an air accommodating part 1101 which accommodates air, and an air wall part 1102 protruding such that the air accommodating part 1101 is formed.

A non-described reference character 800 means a first tray which is coupled to overlap a lower portion of the second tray 800, and transfers cooling energy to the second tray 800.

Although the technological scope of the above-described present invention is described with specific embodiments, the scope of the present invention is not limited to the above-described specific embodiments. Various other embodiments that may be changed or modified by those skilled in the art without departing from the scope and spirit of the present invention defined by the appended claims fall within the scope of the present invention.

What is claimed is:

1. A refrigerator comprising:

a main body;

an ice-making chamber formed in the main body;

a refrigerant pipe in which a refrigerant flows;

an ice-making chamber fan configured to forcibly flow air in the ice-making chamber; and an ice-making tray which stores ice-making water and generates ice, wherein the ice-making tray includes:

a first tray having a refrigerant pipe accommodating recess which accommodates the refrigerant pipe; and a second tray having at least one ice-making cell which stores the ice-making water, and coupled to overlap a top surface of the first tray, and at least one heat-transfer-area-reducing *through* hole is formed in the refrigerant pipe accommodating recess of the first tray to decrease a heat transfer area between the first tray and the refrigerant pipe such that a cooling speed of the first tray is reduced.

2. The refrigerator of claim 1, wherein the second tray is formed of a material having a lower thermal conductivity than the first tray.

3. The refrigerator of claim 1, wherein cooling energy in the refrigerant pipe sequentially passes through the first tray and the second tray, and is transmitted to the ice-making water stored in the at least one ice-making cell.

4. The refrigerator of claim 1, wherein at least one ice-making cell accommodating recess which is provided to correspond to the at least one ice-making cell and accommodates the at least one ice-making cell is formed in the first tray.

5. The refrigerator of claim 1, wherein at least one heat exchanging rib protrudes at the first tray to expand an area through which heat transfers from the first tray to air in the ice-making chamber, and to facilitate cooling of the air in the ice-making chamber.

6. The refrigerator of claim 1, wherein the second tray includes a fastener which fixes the ice-making tray in the ice-making chamber.

7. The refrigerator of claim 6, wherein the fastener includes a groove coupled to a hook provided at a ceiling of an inner box of the ice-making chamber.

8. The refrigerator of claim 6, wherein the fastener includes a mount which is put on and supported by a support provided in the ice-making chamber.

9. The refrigerator of claim 6, wherein the fastener is formed at an upper outside of the ice-making cell of the second tray.

10. The refrigerator of claim 6, wherein an upper side of the ice-making cell of the second tray is open.

11. The refrigerator of claim 1, wherein the second tray includes a water supply hole through which water is supplied to the ice-making chamber.

12. The refrigerator of claim 1, wherein the first tray and the second tray respectively include a first coupler and a second coupler which are respectively coupled to each other.

13. The refrigerator of claim 12, wherein the first coupler and the second coupler are respectively provided at sides of the first tray and the second tray, and are elastically coupled to each other.

14. The refrigerator of claim 1, further comprising:

an ejector which rotates to separate ice in the ice-making cell; and an ice separating motor which supplies a rotational force to the ejector, wherein the second tray includes an air insulator which insulates the ice-making tray from the ice separating motor.

15. The refrigerator of claim 14, wherein the air insulator includes an air accommodating cavity in which air is accommodated, and an air accommodating cavity wall protruding from the second tray such that the air accommodating cavity is formed.

* * * * *